US010884326B2

(12) United States Patent
Yoshida et al.

(10) Patent No.: US 10,884,326 B2
(45) Date of Patent: Jan. 5, 2021

(54) PROJECTION OPTICAL SYSTEM AND PROJECTOR

(71) Applicant: NITTOH INC., Suwa (JP)

(72) Inventors: Masashi Yoshida, Nagano (JP); Takahiko Matsuo, Nagano (JP)

(73) Assignee: NITTOH INC., Suwa (JP)

( * ) Notice: Subject to any disclaimer, the term of this patent is extended or adjusted under 35 U.S.C. 154(b) by 0 days.

(21) Appl. No.: 16/471,580

(22) PCT Filed: Dec. 21, 2017

(86) PCT No.: PCT/JP2017/045876
§ 371 (c)(1),
(2) Date: Jun. 20, 2019

(87) PCT Pub. No.: WO2018/117209
PCT Pub. Date: Jun. 28, 2018

(65) Prior Publication Data
US 2020/0241400 A1 Jul. 30, 2020

(30) Foreign Application Priority Data
Dec. 21, 2016 (JP) .................................. 2016-248213

(51) Int. Cl.
G03B 21/14 (2006.01)
G03B 21/28 (2006.01)
H04N 9/31 (2006.01)
(52) U.S. Cl.
CPC ........... G03B 21/147 (2013.01); G03B 21/28 (2013.01); H04N 9/315 (2013.01)
(58) Field of Classification Search
CPC ....... G03B 21/147; G03B 21/28; H04N 9/315
(Continued)

(56) References Cited

U.S. PATENT DOCUMENTS

| 2011/0267687 | A1 | 11/2011 | Kim et al. |
| 2014/0002802 | A1 | 1/2014 | Hsu et al. |
| 2014/0204351 | A1* | 7/2014 | Matsuo ................. G02B 15/15 353/98 |

FOREIGN PATENT DOCUMENTS

| JP | 2012-108267 A | 6/2012 |
| JP | 2013-061604 A | 4/2013 |

(Continued)

OTHER PUBLICATIONS

Translation of PCT International Preliminary Report on Patentability (Chapter II), International Application No. PCT/JP2017/045876, dated Jan. 9, 2019; 5 pages.

(Continued)

*Primary Examiner* — Jerry L Brooks
(74) *Attorney, Agent, or Firm* — Thompson Hine LLP

(57) ABSTRACT

A projection optical projects from a first image plane on a reducing side onto a second image plane on a magnifying side includes: a first optical system with a plurality of lenses that forms a first intermediate image on a first side of an optical axis inside the first optical system by light that is incident from the reducing side, into a second intermediate image on a second side of the optical axis at a position closer to the magnifying side than the first optical system. A second optical system includes a first reflective surface with positive power that is positioned closer to the magnifying side than the second intermediate image. The first optical system includes an intermediate lens. The first intermediate image is formed to be inclined to be closer to the reducing side as a distance from the optical axis increases so as to straddle the intermediate lens.

14 Claims, 19 Drawing Sheets

(58) Field of Classification Search
USPC .......................................................... 353/69
See application file for complete search history.

(56) References Cited

FOREIGN PATENT DOCUMENTS

| | | |
|---|---|---|
| JP | 2014-098750 A | 5/2014 |
| JP | 2015-200829 A | 11/2015 |
| JP | 2015-215478 A | 12/2015 |
| WO | 2013/005444 A1 | 1/2013 |
| WO | 2014/103324 A1 | 7/2014 |
| WO | 2016/068269 A1 | 5/2016 |
| WO | 2018/066714 A1 | 4/2018 |

OTHER PUBLICATIONS

PCT, Japan Patent Office (ISA/JP), English Translation of International Search Report, International Application No. PCT/JP2017/045876, 2 pages (dated Mar. 20, 2018).

* cited by examiner

Fig. 2

| SURFACE S (No.) | RADIUS OF CURVATURE Ri (mm) | DISTANCE di (mm) | EFFECTIVE DIAMETER Di (mm) | REFRACTIVE INDEX nd | ABBE NUMBER νd | LENS |
|---|---|---|---|---|---|---|
| LIGHT VALVE | Flat | 0.700 | | | | |
| C.G. | Flat | 1.000 | | 1.51633 | 64.14 | |
| | Flat | 22.490 | | | | |
| 1 | 13.080 | 4.800 | 11.60 | 1.59522 | 67.73 | L1 |
| 2 | −71.570 | 1.735 | 9.80 | | | |
| STOP | Flat | 0.305 | 9.48 | | | St |
| 3 | 21.920 | 1.050 | 9.50 | 1.67270 | 32.10 | L2 |
| 4 | 12.480 | 2.330 | 9.20 | | | |
| 5 | −9.050 | 0.800 | 9.30 | 1.60342 | 38.03 | L3 |
| 6 | 83.700 | 4.500 | 10.50 | 1.49700 | 81.54 | L4 |
| 7 | −12.130 | 0.150 | 13.60 | | | |
| 8 | 41.320 | 9.050 | 17.60 | 1.53775 | 74.70 | L5 |
| 9 | −12.550 | 1.800 | 19.50 | 1.67790 | 55.34 | L6 |
| 10 | −26.920 | 9.770 | 22.20 | | | |
| 11 | 43.050 | 7.650 | 30.00 | 1.79951 | 42.22 | L7 |
| 12 | 1629.850 | 22.150 | 29.70 | | | |
| 13 | −7.200 | 4.000 | 29.00 | 1.50917 | 56.28 | L8 |
| 14 | −13.280 | 0.930 | 33.00 | | | |
| 15 | 26.680 | 8.000 | 34.10 | 1.69679 | 55.53 | L9 |
| 16 | 265.000 | 11.750 | 32.90 | | | |
| 17 | 5.600 | 5.500 | 25.30 | 1.50917 | 56.28 | L10 |
| 18 | 10.370 | 4.600 | 23.30 | | | |
| 19 | −35.400 | 0.850 | 22.10 | 1.65411 | 39.68 | L11 |
| 20 | 147.130 | 6.550 | 21.80 | | | |
| 21 | 141.640 | 8.000 | 22.40 | 1.80400 | 46.58 | L12 |
| 22 | −23.205 | 3.630 | 22.80 | | | |
| 23 | 29.435 | 7.900 | 17.00 | 1.49700 | 81.54 | L13 |
| 24 | −14.950 | 1.000 | 14.10 | 1.62004 | 36.26 | L14 |
| 25 | 24.170 | 1.500 | 12.60 | | | |
| 26 | 66.050 | 4.000 | 12.40 | 1.72915 | 54.68 | L15 |
| 27 | −23.865 | 60.940 | 11.80 | | | |
| M1 (28) | −17.250 | −380.000 | 60.00 | | | M1 |
| SCREEN | Flat | | | | | |

Fig. 3

| LENS | FOCAL LENGTH (mm) | FOCAL LENGTH (mm) | FOCAL LENGTH (mm) |
|---|---|---|---|
| L1 | 18.98 | (FF1) 28.13 | (G1) 36.27 |
| L2 | −45.10 | | |
| L3/4 (B1) | −57.87 | | |
| L5/6 (B2) | 38.64 | | |
| L7 | 52.57 | (LF1) 222.06 | |
| L8 | −39.70 | | |
| L9 | 42.00 | (LF2) 42.00 | |
| L10 | 17.21 | (LF3) 22.92 | (G2) 37.55 |
| L11 | −43.54 | | |
| L12 | 25.35 | | |
| L13/14 (B3) | −72.30 | (LS1) 40.11 | |
| L15 | 24.50 | | |
| M1 | 8.63 | | |

Fig. 4

| SURFACE S (No.) | K | A | B | C | D | E |
|---|---|---|---|---|---|---|
| 1 | −0.8873 | −1.6170E−05 | 9.5940E−08 | 6.2040E−09 | 2.3020E−12 | — |
| 2 | 0.0000 | 5.9290E−06 | −1.4200E−07 | 5.2430E−09 | 3.5330E−11 | — |
| 13 | −0.9450 | 1.1470E−05 | 5.6250E−07 | −1.7560E−09 | 2.3560E−12 | — |
| 14 | −1.5000 | −3.5650E−05 | 1.3860E−07 | −4.3480E−10 | 6.9680E−13 | — |
| 17 | −1.9145 | −7.3650E−04 | 8.0350E−06 | −3.9005E−08 | 7.4410E−11 | — |
| 18 | −9.9000 | −1.9250E−04 | 2.6540E−06 | −1.6680E−08 | 3.8890E−11 | — |
| M1 | −0.9600 | 5.3800E−06 | −2.4350E−10 | −4.1380E−12 | 2.8970E−15 | −3.6350E−19 |

| DISTANCE (mm) | Pos1 | Pos2 | Pos3 |
|---|---|---|---|
| d10 | 9.770 | 9.680 | 9.940 |
| d14 | 0.930 | 1.000 | 0.790 |
| d16 | 11.750 | 11.730 | 11.790 |
| d22 | 3.630 | 3.670 | 3.560 |
| d28(M1) | -380.000 | -350.000 | -450.000 |

Fig. 11

| SURFACE S (No.) | RADIUS OF CURVATURE Ri (mm) | DISTANCE di (mm) | EFFECTIVE DIAMETER Di (mm) | REFRACTIVE INDEX nd | ABBE NUMBER $\nu d$ | LENS |
|---|---|---|---|---|---|---|
| LIGHT VALVE | Flat | 0.700 | | | | |
| C.G. | Flat | 1.000 | | 1.51633 | 64.14 | |
| | Flat | 22.380 | | | | |
| 1 | 12.810 | 4.800 | 11.60 | 1.59522 | 67.73 | L1 |
| 2 | −47.065 | 1.740 | 9.80 | | | |
| STOP | Flat | 0.300 | 9.38 | | | St |
| 3 | 21.725 | 1.050 | 9.50 | 1.73799 | 32.26 | L2 |
| 4 | 13.245 | 2.100 | 9.30 | | | |
| 5 | −10.520 | 0.800 | 9.30 | 1.65411 | 39.68 | L3 |
| 6 | 26.915 | 4.500 | 10.50 | 1.49700 | 81.54 | L4 |
| 7 | −15.355 | 0.150 | 13.60 | | | |
| 8 | 44.210 | 9.100 | 17.40 | 1.53775 | 74.70 | L5 |
| 9 | −11.150 | 1.800 | 19.20 | 1.67790 | 55.34 | L6 |
| 10 | −22.515 | 9.560 | 22.50 | | | |
| 11 | 57.445 | 7.650 | 30.70 | 1.80400 | 46.58 | L7 |
| 12 | −100.155 | 20.950 | 30.80 | | | |
| 13 | −7.690 | 4.000 | 29.80 | 1.50917 | 56.28 | L8 |
| 14 | −13.290 | 0.940 | 33.90 | | | |
| 15 | 22.100 | 8.000 | 33.00 | 1.60311 | 60.64 | L9 |
| 16 | 51.050 | 11.550 | 30.90 | | | |
| 17 | 5.475 | 6.000 | 25.10 | 1.50917 | 56.28 | L10 |
| 18 | 10.815 | 5.500 | 23.30 | | | |
| 19 | −21.395 | 0.850 | 22.50 | 1.65411 | 39.68 | L11 |
| 20 | −66.695 | 6.140 | 22.80 | | | |
| 21 | −67.255 | 8.000 | 23.20 | 1.80400 | 46.58 | L12 |
| 22 | −21.330 | 5.120 | 24.40 | | | |
| 23 | 19.525 | 7.900 | 18.10 | 1.49700 | 81.54 | L13 |
| 24 | −25.090 | 1.000 | 15.50 | 1.62004 | 36.26 | L14 |
| 25 | 18.525 | 0.980 | 13.80 | | | |
| 26 | 36.610 | 4.000 | 13.70 | 1.72915 | 54.68 | L15 |
| 27 | −31.060 | 60.940 | 12.90 | | | |
| M1(28) | −15.800 | −380.000 | 57.60 | | | M1 |
| SCREEN | Flat | | | | | |

Fig. 12

| LENS | FOCAL LENGTH (mm) | FOCAL LENGTH (mm) | FOCAL LENGTH (mm) |
|---|---|---|---|
| L1 | 17.44 | (FF1) 28.00 | (G1) 30.05 |
| L2 | −48.53 | | |
| L3/4 (B1) | −35.44 | | |
| L5/6 (B2) | 35.18 | | |
| L7 | 46.41 | (LF1) 111.12 | |
| L8 | −47.22 | | |
| L9 | 58.53 | (LF2) 58.53 | |
| L10 | 15.79 | (LF3) 22.25 | (G2) 47.29 |
| L11 | −48.52 | | |
| L12 | 36.05 | | |
| L13/14 (B3) | −136.48 | (LS1) 33.96 | |
| L15 | 23.63 | | |
| M1 | 7.90 | | |

Fig. 13

| SURFACE S (No.) | K | A | B | C | D | E |
|---|---|---|---|---|---|---|
| 1 | −0.7390 | −2.1780E−05 | −9.4650E−08 | 1.1270E−08 | −1.1760E−10 | — |
| 2 | 0.0000 | 2.1820E−05 | −4.2420E−07 | 1.1330E−08 | −1.2690E−10 | — |
| 13 | −0.8748 | −9.5135E−06 | 5.0445E−07 | −1.5095E−09 | 2.7610E−12 | — |
| 14 | −1.1680 | −4.6910E−05 | 1.3090E−07 | −5.2145E−10 | 9.6910E−13 | — |
| 17 | −1.7820 | −6.5500E−04 | 7.1595E−06 | −3.4640E−08 | 6.5085E−11 | — |
| 18 | −9.9000 | −1.4140E−04 | 1.7680E−06 | −1.1460E−08 | 2.8410E−11 | — |
| M1 | −0.9965 | 8.1740E−06 | −4.1205E−09 | −3.5270E−12 | 4.0540E−15 | −9.4350E−19 |

Fig. 14

| DISTANCE (mm) | Pos1 | Pos2 | Pos3 |
|---|---|---|---|
| d10 | 9.560 | 9.490 | 9.730 |
| d14 | 0.940 | 1.000 | 0.840 |
| d16 | 11.550 | 11.510 | 11.580 |
| d22 | 5.120 | 5.170 | 5.020 |
| d28(M1) | −380.000 | −350.000 | −450.000 |

| SURFACE S (No.) | RADIUS OF CURVATURE Ri (mm) | DISTANCE di (mm) | EFFECTIVE DIAMETER Di (mm) | REFRACTIVE INDEX nd | ABBE NUMBER $\nu$d | LENS |
|---|---|---|---|---|---|---|
| LIGHT VALVE | Flat | 0.700 | | | | |
| C.G. | Flat | 1.000 | | 1.51633 | 64.14 | |
| | Flat | 22.400 | | | | |
| 1 | 11.280 | 4.800 | 11.60 | 1.59522 | 67.73 | L1 |
| 2 | -93.675 | 1.740 | 9.80 | | | |
| STOP | Flat | 0.300 | 9.20 | | | St |
| 3 | 12.560 | 1.050 | 9.50 | 1.64769 | 33.79 | L2 |
| 4 | 8.905 | 2.760 | 9.10 | | | |
| 5 | -9.220 | 0.800 | 9.10 | 1.61293 | 37.00 | L3 |
| 6 | 30.390 | 4.500 | 10.50 | 1.49700 | 81.54 | L4 |
| 7 | -12.975 | 0.150 | 13.60 | | | |
| 8 | 44.945 | 9.100 | 17.80 | 1.53775 | 74.70 | L5 |
| 9 | -11.425 | 1.800 | 19.50 | 1.67790 | 55.34 | L6 |
| 10 | -25.520 | 9.780 | 23.00 | | | |
| 11 | 38.500 | 7.600 | 33.30 | 1.90365 | 31.31 | L7 |
| 12 | 105.440 | 21.550 | 32.50 | | | |
| 13 | -6.512 | 4.000 | 33.00 | 1.50917 | 56.28 | L8 |
| 14 | -10.135 | 0.920 | 35.70 | | | |
| 15 | 29.075 | 8.000 | 36.10 | 1.69679 | 55.53 | L9 |
| 16 | 477.360 | 15.300 | 35.40 | | | |
| 17 | 6.050 | 5.600 | 24.20 | 1.50917 | 56.28 | L10 |
| 18 | 12.235 | 4.500 | 22.70 | | | |
| 19 | -46.235 | 0.850 | 20.60 | 1.65411 | 39.68 | L11 |
| 20 | 28.605 | 4.500 | 19.70 | | | |
| 21 | 69.305 | 8.000 | 20.30 | 1.80609 | 40.93 | L12 |
| 22 | -24.660 | 2.550 | 20.30 | | | |
| 23 | 14.435 | 7.900 | 15.50 | 1.49700 | 81.54 | L13 |
| 24 | -16.095 | 1.000 | 11.90 | 1.62004 | 36.26 | L14 |
| 25 | 14.910 | 1.390 | 12.60 | | | |
| 26 | 71.740 | 4.000 | 13.00 | 1.72915 | 54.68 | L15 |
| 27 | -22.735 | 60.940 | 14.60 | | | |
| M1(28) | -21.200 | -380.000 | 62.40 | | | M1 |
| SCREEN | Flat | | | | | |

Fig. 20

| LENS | FOCAL LENGTH (mm) | FOCAL LENGTH (mm) | FOCAL LENGTH (mm) |
|---|---|---|---|
| L1 | 17.21 | (FF1) 26.34 | (G1) 53.03 |
| L2 | −53.26 | | |
| L3/4 (B1) | −43.97 | | |
| L5/6 (B2) | 39.63 | | |
| L7 | 63.68 | (LF1) 273.73 | |
| L8 | −57.01 | | |
| L9 | 44.11 | (LF2) 44.11 | |
| L10 | 18.00 | (LF3) 22.70 | (G2) 27.45 |
| L11 | −26.90 | | |
| L12 | 23.45 | | |
| L13/14 (B3) | −194.86 | (LS1) 34.76 | |
| L15 | 24.11 | | |
| M1 | 10.60 | | |

Fig. 21

| SURFACE S (No.) | K | A | B | C | D | E |
|---|---|---|---|---|---|---|
| 1 | −0.8660 | −1.6700E−05 | 5.5650E−07 | −5.6010E−09 | 2.1030E−10 | — |
| 2 | 0.0000 | −1.2310E−05 | 1.1110E−07 | 6.4660E−09 | 8.9600E−11 | — |
| 13 | −0.9071 | 6.6695E−06 | 7.2270E−07 | −1.3220E−09 | 1.3780E−12 | — |
| 14 | −1.5100 | −9.0465E−05 | 1.9855E−07 | −1.2130E−11 | 8.0940E−14 | — |
| 17 | −1.1035 | −7.6950E−04 | 6.8510E−06 | −3.3200E−08 | 7.0990E−11 | — |
| 18 | −9.9000 | −1.5580E−04 | 1.8890E−06 | −1.3180E−08 | 3.6100E−11 | — |
| M1 | −0.9000 | 5.1410E−07 | 2.0910E−09 | −4.1980E−12 | 3.0240E−15 | −6.9890E−19 |

Fig. 22

| DISTANCE (mm) | Pos1 | Pos2 | Pos3 |
|---|---|---|---|
| d10 | 9.780 | 9.620 | 10.060 |
| d14 | 0.920 | 1.130 | 0.660 |
| d16 | 15.300 | 15.210 | 15.360 |
| d22 | 2.550 | 2.590 | 2.470 |
| d28(M1) | −380.000 | −350.000 | −450.000 |

(a)

(b)

(a)

(b)

PROJECTION OPTICAL SYSTEM AND PROJECTOR

TECHNICAL FIELD

The present invention relates to a projection optical system of a projector.

BACKGROUND ART

Japanese Laid-open Patent Publication No. 2013-61604 (hereinafter, "Document 1") discloses a technology that provides a more compact projection optical system that is capable of projecting better images onto a projection surface from a closer distance. Document 1 discloses a projection optical system that includes a first optical system that has an optical axis and forms a first image that is conjugated with an object and a second optical system that projects a second image, which is conjugated with the first image, onto the projection surface. The first image satisfies a condition that $Im \times Tr \leq 1.70$, where Im represents the length of the first image in the direction of the optical axis of the first optical system when standardized according to the focal length of the first optical system and Tr represents the throw ratio of the projection optical system. The throw ratio is the ratio of the projection distance of the projection optical system (that is, the distance from the principal point of the second optical system to the screen) to the size of the image projected onto the screen in the horizontal direction.

SUMMARY OF INVENTION

There is demand for a projection optical system that has a low throw ratio so as to be capable of projecting images at shorter distances, is capable of projecting high-quality images, and is also compact.

One aspect of the present invention is a projection optical system that projects from a first image plane on a reducing side onto a second image plane on a magnifying side and includes a first optical system including a plurality of lenses. The first optical system forms a first intermediate image formed inside the first optical system by light that is incident from the reducing side, into a second intermediate image on the magnifying side of the first optical system. The first intermediate image is formed on a first side of an optical axis and the second intermediate image is formed on a second side of the optical axis. The projection optical system further includes a second optical system including a first reflective surface that has positive power and is located on the magnifying side of the second intermediate image. The first optical system also includes an intermediate lens, and the first intermediate image is formed so as to be inclined so as to approach the reducing side as a distance from the optical axis increases and so as to across or straddle the intermediate lens.

In this projection optical system, which includes the first optical system that has the first intermediate image formed inside and which forms the first intermediate image into the second intermediate image on the magnifying side, that is, on the input side (reducing side) of the first reflective surface, it is possible to reduce the length along the optical axis of the second intermediate image that is the input of the first reflective surface. This means that it is possible to dispose a compact first reflective surface that has high refractive power, and possible to provide a projection optical system which is compact, has high magnification, and a low throw ratio.

In addition, with the first optical system that forms the first intermediate image, which is formed on the first side of the optical axis, into the second intermediate image on the second side of the optical axis, that is, on the opposite side of the optical axis to the first intermediate image, on the magnifying side of the first optical system, by forming the first intermediate image so as to be inclined toward the reducing side as the distance from the optical axis increases, providing the intermediate lens so as to be spanned, straddled or cut across by the first intermediate image, and having the first intermediate image and the intermediate lens coincide in the same space, it is possible to place many lenses within the overall length of the first optical system. This means it is possible to reduce the overall length of the projection optical system, to reduce the throw ratio, and to also improve the quality of the projected images.

The intermediate lens may be a lens that moves for focusing. Since light flux before and after the first intermediate image is dispersed corresponding to the image height, the intermediate lens, which the first intermediate image is cutting or extended across, has a large effect on focusing, which means that it is suitable to move the intermediate lens for focusing purposes. When a bottom end of the first intermediate image that is close to the optical axis is positioned outside the intermediate lens on the magnifying side and a top end of the first intermediate image that is distant from the optical axis is positioned outside the intermediate lens on the reducing side, it is desirable for the intermediate lens to move between the bottom end and the top end for focusing. When the intermediate lens moves sufficiently for the bottom end of the first intermediate image to enter the intermediate lens, the image will be susceptible to the influence of dust and the like adhering to the intermediate lens. When the intermediate lens moves sufficiently for the top end of the first intermediate image to enter the intermediate lens, it becomes difficult to correct aberration.

The intermediate lens is typically a positive meniscus lens that is convex on the reducing side and is inclined in the opposite direction to the first intermediate image. The first optical system may further include a front-side negative meniscus lens that is convex on the magnifying side and is located adjacent to the reducing side of the intermediate lens. The lens interval between the intermediate lens and the front-side lens increases as the distance from the optical axis increases, which makes the combination of these lenses suited to keystone correction.

Another aspect of the present invention is a projector including the projection optical system described above and a light modulator that forms an image on the first image plane. The projector may also include an illumination optical system that illuminates the first image plane.

BRIEF DESCRIPTION OF DRAWINGS

FIG. 2 is a table showing lens data.

FIG. 3 is a table showing the focal lengths of lenses and lens groups.

FIG. 4 is a table showing aspherical surface data.

FIG. 11 is a table that shows lens data of the projection optical system depicted in FIG. 10.

FIG. 12 is a table that shows focal lengths of lenses and lens groups.

FIG. 13 is a table that shows aspherical surface data.

FIG. 14 is a table that shows the respective positions of groups during focusing.

FIG. 19 is a table that shows lens data of the projection optical system depicted in FIG. 18.

FIG. 20 is a table that shows the focal lengths of lenses and lens groups.

FIG. 21 is a table that shows aspherical surface data.

FIG. 22 is a table that shows the respective positions of groups during focusing.

DESCRIPTION OF EMBODIMENTS

Figure 1:
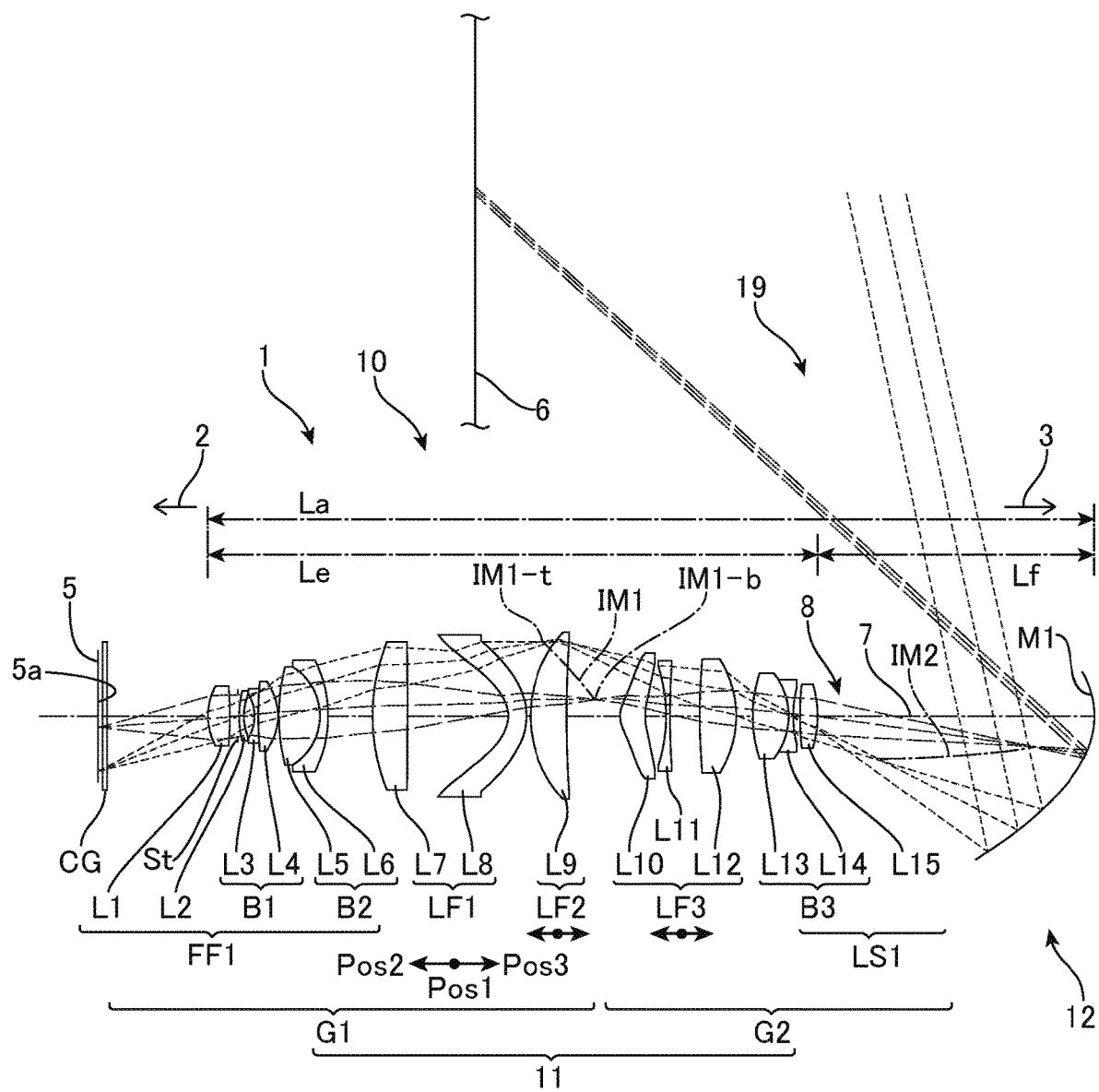
FIG. 1 is a diagram depicting one example configuration of a projector and a projection optical system.

The following discloses a number of conditions for a projection optical system that includes a first optical system including a plurality of lenses and a second optical system including a first reflective surface that has positive power and is a projection optical system where the first reflective surface of the second optical system reflects light outputted from the first optical system and projects the outputted light as projection light onto a screen. The first optical system is a refractive optical system (or "lens system") that forms a first intermediate image, which is formed inside the first optical system by light that is incident from the reducing side, into a second intermediate image that is closer to the magnifying side than the first optical system.

The combined focal length fa of the projection optical system and the radius of curvature rm of the first reflective surface may satisfy Conditions (1) and (2) below.

$$40 < |rm \times fa| < 80 \quad (1)$$

$$5.8 < |rm/fa| < 7.9 \quad (2)$$

Here, the combined focal length fa and the radius of curvature rm are expressed in millimeter units. Having the power of the first reflective surface and the refractive power of the projection optical system both sufficiently high as indicated by Condition (1) and having the power of the first reflective surface relative to the refractive power of the projection optical system in the range indicated by Condition (2) is suited to the provision of a projection optical system that is compact and has a low throw ratio. The lower limit of Condition (1) may be 45.5 and the upper limit may be 60.0.

In particular, the radius of curvature rm of the first reflective surface may satisfy Condition (3) below.

$$15.0 < |rm| < 21.5 \quad (3)$$

The combined focal length fa of the projection optical system and a combined focal length f2 of a second lens group described below may satisfy Condition (4) below.

$$8 < f2/fa < 20 \quad (4)$$

Here, the combined focal length fa and the combined focal length f2 are expressed in millimeter units. The lower limit of Condition (4) may be 10.0 or may be 13.0. The upper limit may be 18.0 or may be 15.0.

In this projection optical system, since light flux is concentrated around the optical axis in a first lens system described below that is positioned closest to the magnifying side out of the first optical system, the effective diameter of the first lens system may be relatively small, making the projection optical system compact and making it easy to avoid interference with light flux that has been reflected by the first reflective surface.

In the projection optical system described above, as indicated in Condition (5), the ratio of the length Le of the first optical system (that is, the effective length of the refractive optical system or the distance along the optical axis from the reducing side-surface of the closest lens to the reducing side to the magnifying side-surface of the lens closest to the magnifying side) to the overall length La along the optical axis from the reducing side-surface of the closest lens to the reducing side in the first optical system to the first reflective surface is 0.6 or above, or in more detail above 0.62, which means that the proportion of the space that can be used for aberration correction is large relative to the overall length and the optical system as a whole is compact. In addition, as indicated in Condition (6), it is possible to provide an optical system with a low throw ratio TR of 0.19 or below or in more detail below 0.19.

$$0.62 < Le/La < 0.72 \quad (5)$$

$$0.17 < TR < 0.19 \quad (6)$$

Note that the throw ratio TR is the ratio between the distance Lm from the first reflective surface to the screen and the size Ln in the length direction (normally the horizontal direction) of the first image plane when projected on the screen, and is defined as indicated below.

$$TR = Lm/Ln \quad (6\text{-}1)$$

Also, in the projection optical system described above, as indicated in Condition (7), the ratio of the length Lf from the first optical system to the first reflective surface (that is, the length along the optical axis from the surface of the closest lens to the magnifying side in the first optical system to the first reflective surface) to the overall length La along the optical axis from the reducing-side surface of the closest lens to the reducing side in the first optical system to the first reflective surface is 0.35 or below, or in more detail below 0.38, which means that the proportion of the space between the refractive optical system and the reflective surface that cannot be used for aberration correction is small relative to the overall length, so that it is possible to make the optical system small as a whole and to provide an optical system with a low throw ratio TR of 0.19 or below as indicated in Condition (6).

$$0.26 < Lf/La < 0.38 \quad (7)$$

The first optical system may include an intermediate lens that the first intermediate image is formed so as to across, a first lens group that includes this intermediate lens and is located (disposed) on the reducing side of the intermediate lens, and the second lens group that is located (disposed) on the magnifying side of the intermediate lens. By disposing a lens so as to coincide with the first intermediate image, it is possible to provide a more compact projection optical system. The first intermediate image may be formed in an inclined manner so as to approach the reducing side as the distance from the optical axis increases. Typically, a bottom end of the first intermediate image that is close to the optical axis is positioned outside the intermediate lens on the magnifying side and the top end of the first intermediate image that is far (distant) from the optical axis is positioned outside the intermediate lens on the reducing side. In this projection optical system, the first intermediate image is an image that is in the process of aberration correction, so that spanning or cutting across the intermediate lens has little influence and what influence does occur is easy to correct.

The focal length fm of the intermediate lens and the combined focal length fa of the projection optical system may satisfy Condition (8) below. If the refractive power of the intermediate lens is too high, the effect of this lens on focusing is too large, which makes focus difficult to adjust. Conversely, if the refractive power is too low, the lens is not suited to focusing.

$$10<|fm/fa|<30 \qquad (8)$$

Here, the focal length fm and the combined focal length fa are expressed in millimeter units.

The first optical system includes a front focusing lens group, which includes a front-side lens disposed adjacent to the reducing side of the intermediate lens and moves for focusing, and a rear focusing lens group, which includes a rear-side lens disposed adjacent to the magnifying side of the intermediate lens and also moves for focusing. Since the amount by which the intermediate lens is capable of moving for focusing purposes is limited, by moving the lens groups to the front and rear of the intermediate lens to adjust focus, it is possible to display even sharper images.

The first optical system may include a first lens group, which is disposed on the reducing side of the intermediate lens and includes the intermediate lens and the front focusing lens group, and a second lens group, which is disposed on the magnifying side of the intermediate lens and includes the rear focusing lens group. The first lens group may include a front fixed lens group, which does not move during focusing and includes a lens disposed on the reducing side of the front focusing lens group. The second lens group may include a rear fixed lens group, which does not move during focusing and includes a lens disposed on the magnifying side of the rear focusing lens group.

The intermediate lens, the front focusing lens group, and the rear focusing lens group each move toward the reducing side to shift the focus from a standard state to a near side and each move toward the magnifying side to shift the focus from the standard state to an infinity side. A distance Di1 moved by the front focusing lens group to shift the focus from the near side to the infinity side, a distance Di2 moved by the intermediate lens to shift the focus from the near side to the infinity side, and a distance Di3 moved by the rear focusing lens group to shift the focus from the near side to the infinity side may satisfy Condition (9) below.

$$Di2<Di1<Di3 \qquad (9)$$

The combined focal length ff of the front focusing lens group, the focal length fm of the intermediate lens and the combined focal length fr of the rear focusing lens group may satisfy Condition (10) below.

$$fr<fm<ff \qquad (10)$$

The first optical system includes, at a position closest to (most toward) the magnifying side, a first lens system that is composed of a first cemented lens and a first biconvex positive lens that are disposed in order from the reducing side. In the first optical system, by constructing the part closest to the magnifying side of the first lens system which is composed, in order from the reducing side, of the first cemented lens and the first biconvex positive lens, it is possible to reduce the overall length of the projection optical system, to reduce the throw ratio, and to improve the quality of the projected images.

By disposing the first positive lens, which is biconvex so that both surfaces have positive refractive power, closest to (most toward) the magnifying side of the first optical system, that is, at the magnifying side-end, and disposing the first cemented lens next to the first positive lens, it is possible to use a design where the light flux that forms the second intermediate image mainly intersects the optical axis inside the first lens system composed of the first positive lens and the first cemented lens. Accordingly, it is possible to form the second intermediate image close to the first optical system and the diameter on the magnifying side of the first optical system is reduced, which makes it possible to dispose the first reflective surface that has high refractive power near the first optical system. Also, since the light flux that forms the second intermediate image mostly intersects the optical axis inside the first lens system, the positions at which the light flux that forms the second intermediate image passes through the first cemented lens and the first positive lens are dispersed, making it easy to correct aberration using these lenses. This means that according to the first lens system that includes the first cemented lens, it is easy to correct not only chromatic aberration but also curvature of field and astigmatism.

It is desirable for the first cemented lens to have negative refractive power. Light flux is concentrated and intersects the optical axis inside the first lens system, which is suited to correcting aberration, but increases tolerance sensitivity (or "sensitivity to errors" or "effectiveness"). By providing the first cemented lens with negative refractive power different to the first positive lens, it is possible to reduce tolerance sensitivity according to the chosen combination of these lenses and to project high-quality images more stably.

The magnifying side surface of the first cemented lens may be concave on the magnifying side. By making the magnifying side-surface of the first cemented lens that faces the convex surface on the reducing side of the first positive lens concave (the first cemented lens is convex on the reducing side), the radii of curvature (or curvature factor) of these surfaces will face in the same direction, making it possible to avoid or prevent having the distance between the surfaces with greatly varying. Accordingly, it is possible to reduce tolerance sensitivity according to the chosen combination of these lenses and to project high-quality images more stably.

FIG. 1 depicts one example of a projector. The projector 1 includes a projection optical system 10 that projects from an image plane (or "first image plane") 5a of a light modulator (or "light valve") 5 on the reducing side 2 onto a screen or wall surface (or "second image plane") 6 on the magnifying side 3. The light valve 5 may be any device capable of forming images, such as an LCD, digital mirror device (DMD), or organic EL, and may be a single panel type or may form separate images of the respective colors. The light valve 5 may be a light-emitting type or may be an illuminated type. When an illuminated type is used, the projector 1 further includes an illumination optical system (not illustrated). The screen 6 may be a wall surface, a white board, or the like, and the projector 1 may be a front projector or may be a rear projector that includes a screen.

The projection optical system 10 includes a first optical system 11 including a plurality of lenses and a second optical system 12 including a first reflective surface M1 that has positive power. The first reflective surface M1 of the second optical system 12 reflects light outputted from the first optical system 11 as projected light 19 onto the screen 6. The first optical system 11 is a refractive optical system (or "lens system") that forms a first intermediate image IM1, which is formed inside the first optical system 11 by light that is incident from the reducing side 2, into a second intermediate image IM2 that is closer to the magnifying side 3 than the first optical system 11. In the present embodiment, the first intermediate image IM1 is formed on the upper side (or "first side") of the optical axis 7 in FIG. 1 and the second intermediate image IM2 is formed on the opposite side (the lower side in FIG. 1, or "second side") of the optical axis 7 to the first intermediate image IM1.

The first optical system 11 includes a first lens group (first refractive optical system) G1 that has an overall positive refractive power and is disposed on the reducing side (input side) 2 and a second lens group (second refractive optical system) G2 that has an overall positive refractive power and is disposed on the magnifying side (output side) 3 of the first lens group G1. The lens that is closest to the magnifying side 3 in the first lens group G1 is the intermediate lens L9 and the first intermediate image IM1 is formed across the intermediate lens L9. This first intermediate image IM1 is formed by the intermediate lens L9 and the second lens group G2 into the second intermediate image IM2 on the reducing side 2 of the first reflective surface (mirror) M1. The mirror M1, which has positive power, magnifies and projects the second intermediate image IM2 onto the screen 6.

FIGS. 2, 3, and 4 depict data on the various elements of the projection optical system 10. In FIG. 2, "S" is the surface number for surfaces of elements that are lenses, "Ri" is the radius of curvature (in mm) of the respective elements (each lens surface in the case of a lens) disposed in order from the reducing side 2, "di" is the distance (interval, in mm) between surfaces of the respective elements disposed in order from the reducing side 2, and "Di" is the effective diameter (or simply "diameter" in mm) of each element. The refractive index (d line) and Abbe number (d line) are also given. FIG. 3 depicts the focal length (in mm) of each lens and combination of a plurality of lenses. FIG. 4 depicts the surface numbers of aspherical surfaces, out of the surfaces of elements, and aspherical surface data. The aspherical surfaces are expressed by the following equation using the coefficient Ri given in FIG. 2 and the coefficients K, A, B, C, D, and E given in FIG. 4 with X as the coordinate in the optical axis direction, Y as the coordinate in a direction perpendicular to the optical axis, the direction in which light propagates as positive, and R as the paraxial radius of curvature. Note that "En" represents "10 to the power n". This also applies to the embodiments given later in this specification.

$$X=(1/Ri)Y^2/[1+\{1-(1+K)(1/Ri)^2Y^2\}^{1/2}]+AY^3+BY^4+CY^6+DY^8+EY^{10}$$

The first optical system 11 (lens system, refractive optical system) of the projection optical system 10 includes a glass block CG on the incident side, the first lens group G1, and the second lens group G2. The first lens group G1 has a nine-lens configuration including, in order from the reducing side 2 (the light-valve side), a positive biconvex lens L1, a stop St, a negative meniscus lens L2 that is convex on the reducing side 2, a negative biconcave lens L3, a positive biconvex lens L4, a positive biconvex lens L5, a negative meniscus lens L6 that is convex on the magnifying side 3, a positive meniscus lens L7 that is convex on the reducing side 2, a negative meniscus lens L8 that is convex on the magnifying side 3, and a positive meniscus lens L9 that is convex on the reducing side 2. The lenses L3 and L4 are cemented to construct a cemented lens (balsam lens) B1 and the lenses L5 and L6 are cemented to construct a cemented lens B2. The cemented lens B1 is favorable for correcting axial chromatic aberration and the cemented lens B2 is favorable for correcting lateral chromatic aberration.

The second lens group G2 has a six-lens configuration including, in order from the reducing side 2, a positive meniscus lens L10 that is convex on the reducing side 2, a negative biconcave lens L11, a positive biconvex lens L12, a positive biconvex lens L13, a negative biconcave lens L14, and a positive biconvex lens L15. The lenses L13 and L14 are cemented to construct a cemented lens B3. The cemented lens B3 is favorable for correcting axial chromatic aberration and lateral chromatic aberration.

The positive biconvex lens L15 is the lens that is closest to (most toward) the magnifying side 3 out of the first optical system 11 and corresponds to the first positive lens L15. The cemented lens B3 corresponds to the first cemented lens B3 that is disposed on the reducing side 2 of the first positive lens L15 with an air gap in between. Accordingly, on the magnifying side 3, the first optical system 11 includes the first lens system LS1 that is composed of the first cemented lens B3 and the first positive lens L15.

The projection optical system 10 is an internal focus-type (inner focus type) system where the lenses L7 and L8 of the first lens group G1 integrally move to adjust the focus as a first focusing group LF1, the lens L9 (the intermediate lens) of the first lens group G1 moves to adjust the focus as a second focusing group LF2, and the lenses L10, L11, and L12 of the second lens group G2 integrally move to adjust the focus as a third focusing group LF3.

The first focusing group LF1 corresponds to the front focusing lens group that moves for focusing purposes and includes the front-side lens L8 disposed adjacent to the reducing side 2 of the intermediate lens L9. The third focusing group LF3 corresponds to the rear focusing lens group that moves for focusing purposes and includes the rear-side lens L10 disposed next to the magnifying side 3 of the intermediate lens L9. The first lens group G1 includes the second focusing group LF2, the first focusing group LF1 that is a focusing lens group positioned in front of the second focusing group LF2, and the front fixed lens group FF1 that does not move during focusing. The front fixed lens group FF1 includes the lenses L1 to L6 disposed on the reducing side 2. The second lens group includes the rear focusing lens group LF3 and a first lens system LS1 that is a rear fixed lens group that does not move during focusing and includes the lenses L13 to L15 disposed on the magnifying side 3 of the rear focusing lens group LF3.

Figures 5, 6:
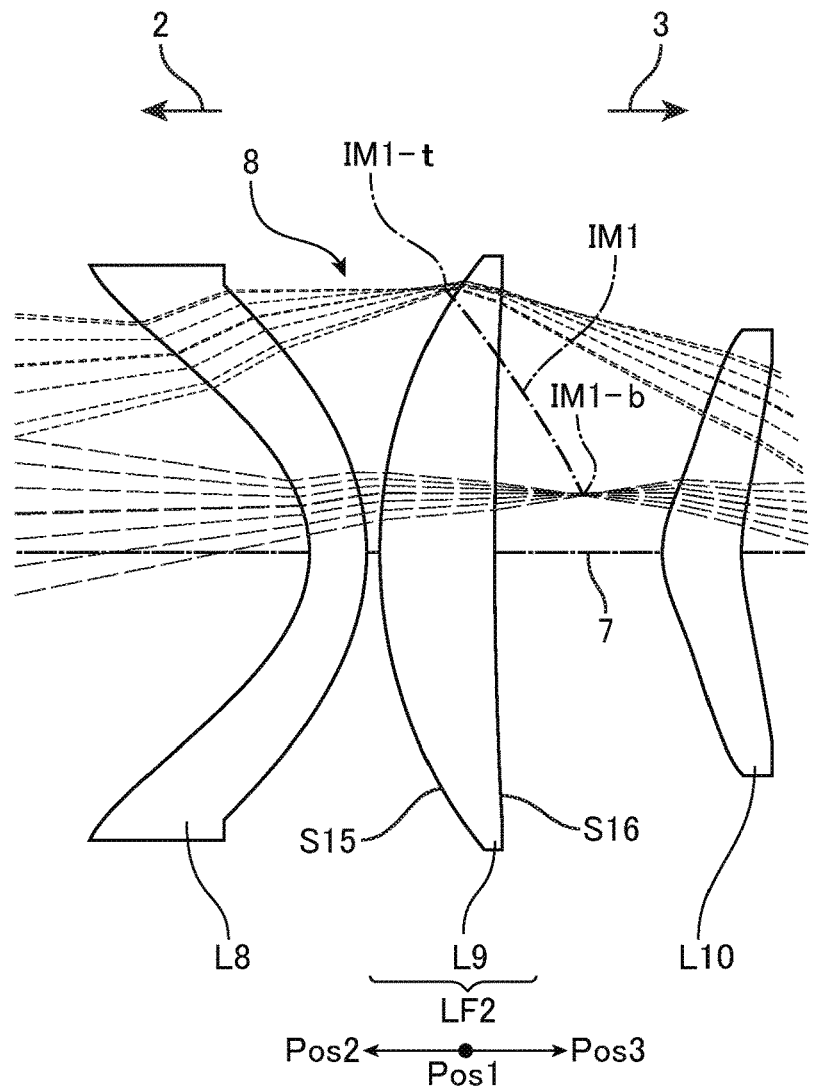
FIG. 5 is a diagram depicting an enlargement of an intermediate lens and lenses to the front and rear of the intermediate lens.
FIG. 6 is a table showing the respective positions of groups during focusing.

FIG. 5 depicts an enlargement of the intermediate lens L9 and the lenses L8 and L10 to the front and rear of the intermediate lens L9. The first intermediate image IM1 is formed so as to be inclined toward the reducing side 2 as the distance from the optical axis 7 increases. The intermediate lens L9 is provided so as to be spanned (straddled, extended across, cutting across) by the first intermediate image IM1. In this way, by disposing the first intermediate image IM1 and the intermediate lens L9 so as to coincide to share the space, it is possible to place many lenses, in the present embodiment a configuration of fifteen lenses (lenses L1 to L15), within the overall length La of the first optical system 11. This makes it possible to reduce the overall length of the projection optical system 10, to reduce the throw ratio TR, and to also improve the quality of the projected images. It is also possible to suppress increases in lens diameter near the first intermediate image, which is also suited to miniaturization.

The intermediate lens L9 is a lens that moves to a standard position Pos1, the near side Pos2, and the infinity side Pos3 for focusing. Light flux 8 before and after the first intermediate image IM1 is dispersed corresponding to the image height (a direction moving away from the optical axis 7). The intermediate lens L9 that the first intermediate image IM1 is formed across, has a large effect on focusing, which means that it is suitable to move the intermediate lens L9 for focusing process.

In the first optical system 11, the bottom end IM1-$b$ of the first intermediate image IM1, i.e., the part close to the optical axis 7, is positioned outside the intermediate lens L9 on the magnifying side 3, that is, on outside of the magnifying side 3 of the magnifying side surface S16 of the lens L9. The top end IM1-$t$ of the first intermediate image IM1, i.e., the part away from the optical axis 7, is positioned outside the intermediate lens L9 on the reducing side 2, that is, on outside of the reducing side 2 of the reducing side surface S15 of the lens L9. The intermediate lens L9 (the second focusing group LF2) moves between the top end IM1-$t$ and the bottom end IM1-$b$ for focusing process. When the intermediate lens L9 moves for the bottom end IM1-$b$ of the first intermediate image IM1 to enter the intermediate lens L9, the image is rather sharp at the bottom end IM1-$b$ and be susceptible to the influence of dust and the like adhering to the surface of the intermediate lens L9. On the other hand, when the intermediate lens L9 moves for the top end IM1-$t$ of the first intermediate image IM1 to enter the intermediate lens L9, it becomes difficult to correct aberration of the peripheral part of the image that is far from the optical axis 7 and is rather magnified.

The intermediate lens L9 in the present embodiment is a positive meniscus lens that is convex on the reducing side and is inclined in the opposite direction to the first intermediate image IM1. The lens (front-side lens) L8 disposed adjacent to the reducing side 2 of the intermediate lens L9 is a negative meniscus lens that is convex on the magnifying side 3. The lens interval between the intermediate lens L9 and the front-side lens L8 increases as the distance from the optical axis 7 increases, which makes the combination of the lenses L8 and L9 suited to keystone correction.

FIG. 6 depicts the distances d10, d14, d16, and d22 that indicate the positional relationships between the first focusing group LF1, the second focusing group LF2, and the third focusing group LF3 when the distance d28 from the mirror M1 to the screen 6 is at the standard state (Pos1), the near side (Pos2), and the infinity side (Pos3). The distance d10 indicates the distance between the magnifying side 3—surface S10 of the lens L6 and the reducing side 2—surface S11 of the lens L7, the distance d14 indicates the distance between the magnifying side 3—surface S14 of the lens L8 and the reducing side 2—surface S15 of the lens L9, the distance d16 indicates the distance between the magnifying side 3—surface S16 of the lens L9 and the reducing side 2—surface S17 of the lens L10, and the distance d22 indicates the distance between the magnifying side 3—surface S22 of the lens L12 and the reducing side 2—surface S23 of the lens L13. This also applies to the embodiments described later.

These focusing groups LF1, LF2, and LF3 move from the reducing side 2 toward the magnifying side 3 as the focal length increases from the near side via the standard state to the infinity side, that is, as the distance between the mirror M1 and the screen 6 increases. During this focusing process, each of the above focusing groups moves individually and moves by different distances. The first focusing group LF1 that is the front focusing lens group moves monotonically by the distance Di1 toward the magnifying side 3 when shifting focus from the near side Pos2 to the infinity side Pos3. That is, compared to the standard state P1, the first focusing group LF1 is moved toward the reducing side 2 when focusing to the near side Pos2 and is moved to the magnifying side 3 when focusing to the infinite side Pos3.

The second focusing group LF2 that includes the intermediate lens is also the same and monotonically moves from the reducing side 2 to the magnifying side 3 by the distance Di2 to shift focus from the near side Pos2 via the standard state Pos1 to the infinity side Pos3. The third focusing group LF3 that includes the rear focusing lens group is also the same and monotonically moves from the reducing side 2 to the magnifying side 3 by the distance Di3 to shift focus from the near side Pos2 via the standard state Pos1 to the infinity side Pos3. The distances Di1, Di2, and Di3 are calculated as indicated below.

$$Di1 = Pos3 - Pos2(\text{Surface } S10) = 0.26 \text{ mm}$$

$$Di2 = Di1 + (Pos3 - Pos2(\text{Surface } S14)) = 0.05 \text{ mm}$$

$$Di3 = Di1 + Di2 + (Pos3 - Pos2(\text{Surface } S16)) = 0.37 \text{ mm} \quad (11)$$

The second focusing group LF2 that includes the intermediate lens L9 that the first intermediate image IM1 formed across, has the smallest distance to move and has a large effect (tolerance sensitivity) during focusing. These three focusing groups LF1, FL2, and LF3 are groups composed of lenses disposed in the vicinity of the first intermediate image IM1, and the light flux before and after the first intermediate image IM1 passes through the first intermediate image IM1 so as to be relatively parallel to the optical axis or dispersed. For this reason, the lenses included in these focusing groups LF1, LF2 and LF3 are moved to finely adjust the positions where the light flux disperses and passes, and by doing so, it is easy to perform fine adjustments to correct aberration. This means that fluctuations in aberration due to the distance between the mirror M1 and the screen 6 can be efficiently corrected.

Figure 7:
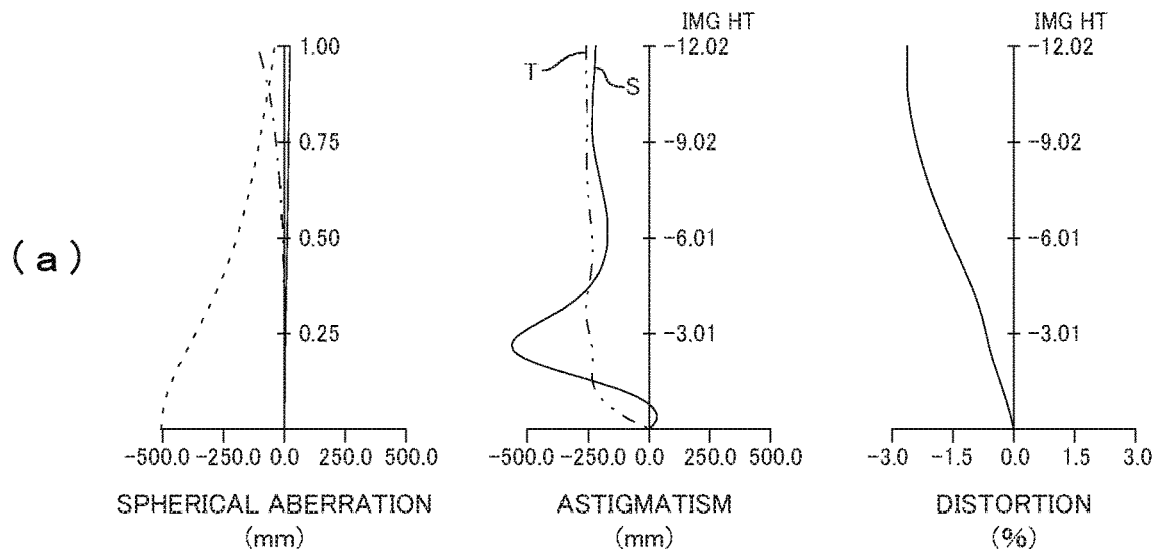
FIG. 7 is graphs indicating aberrations in a standard state.
Figure 7:
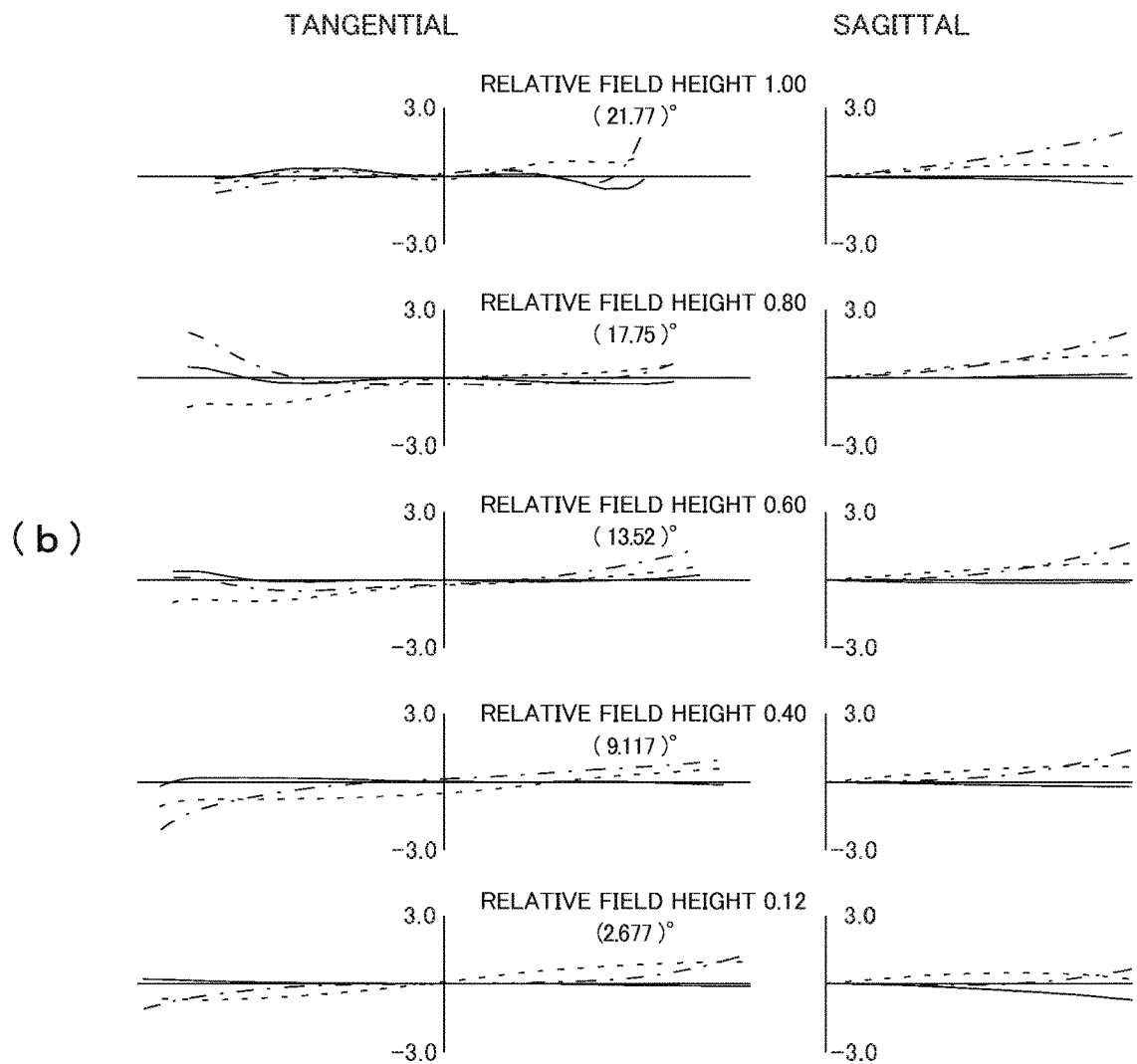
Figure 8:
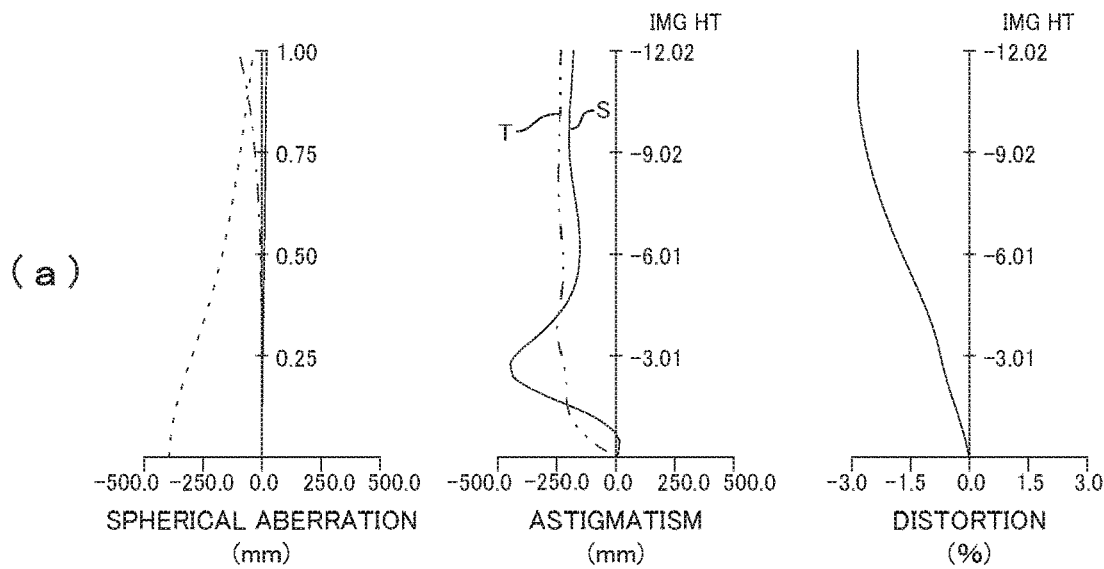
FIG. 8 is graphs indicating aberrations at a near side.
Figure 8:
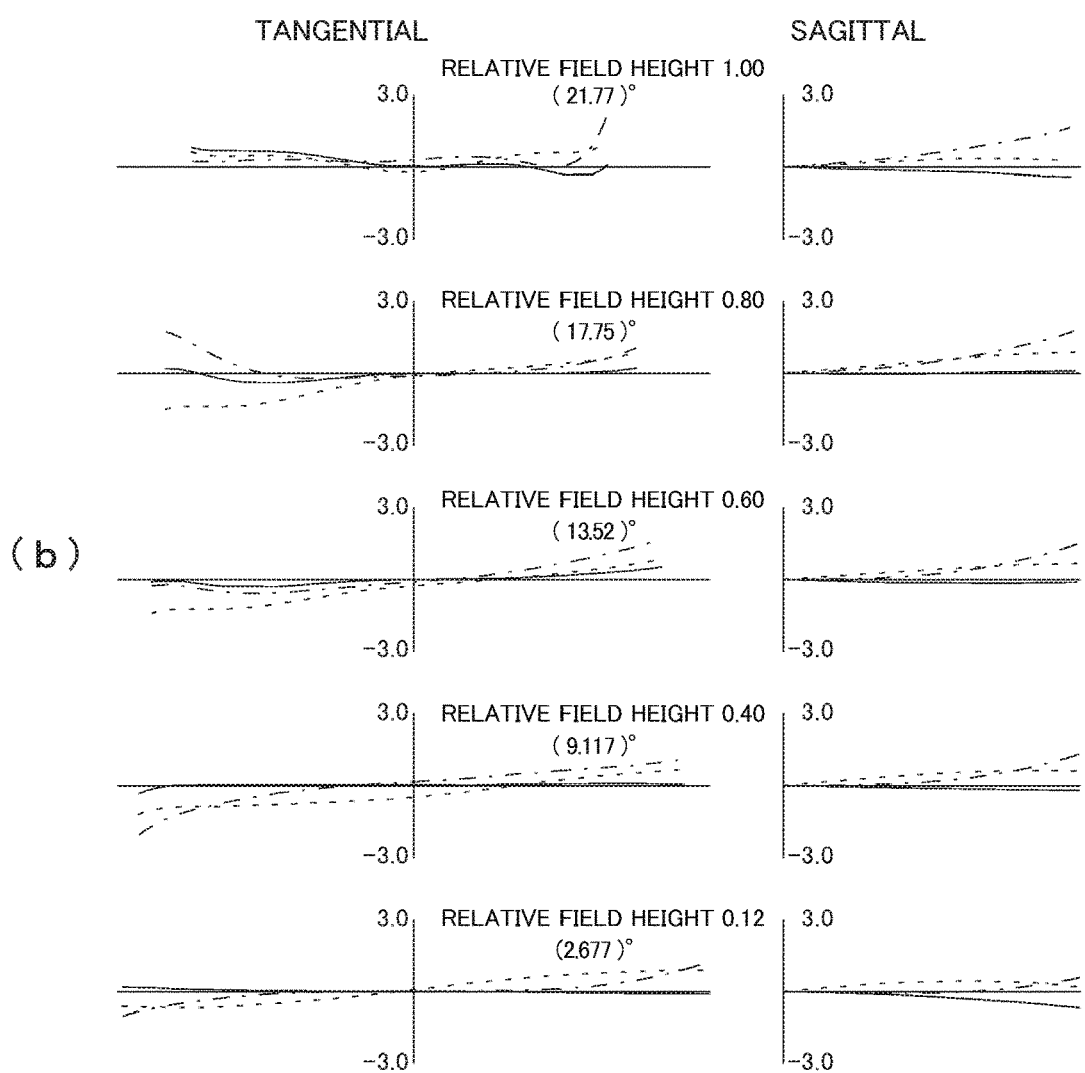
Figure 9:
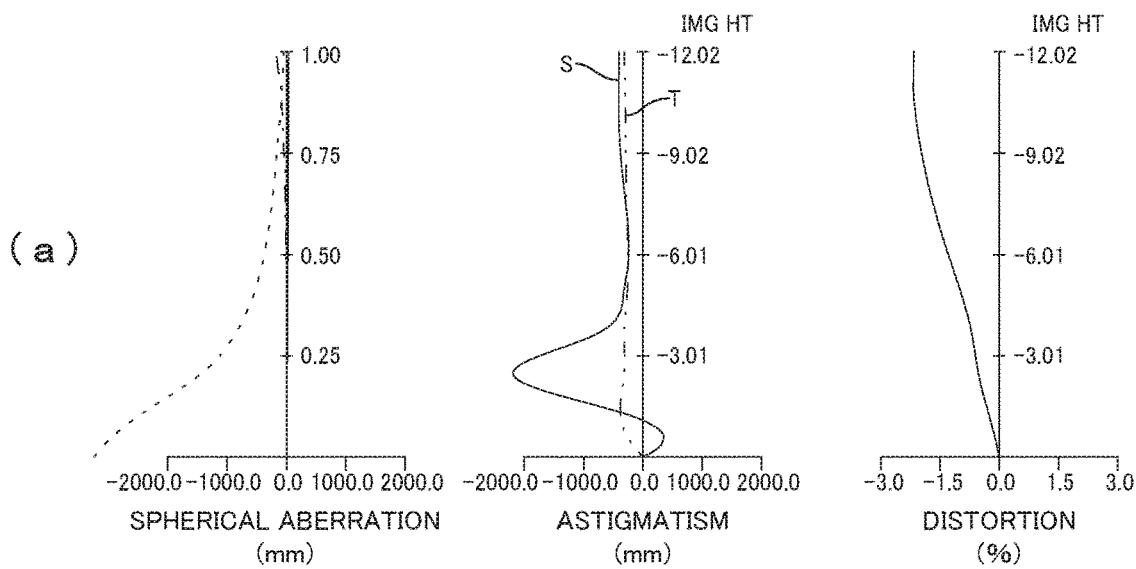
FIG. 9 is graphs indicating aberrations at an infinity side.
Figure 9:
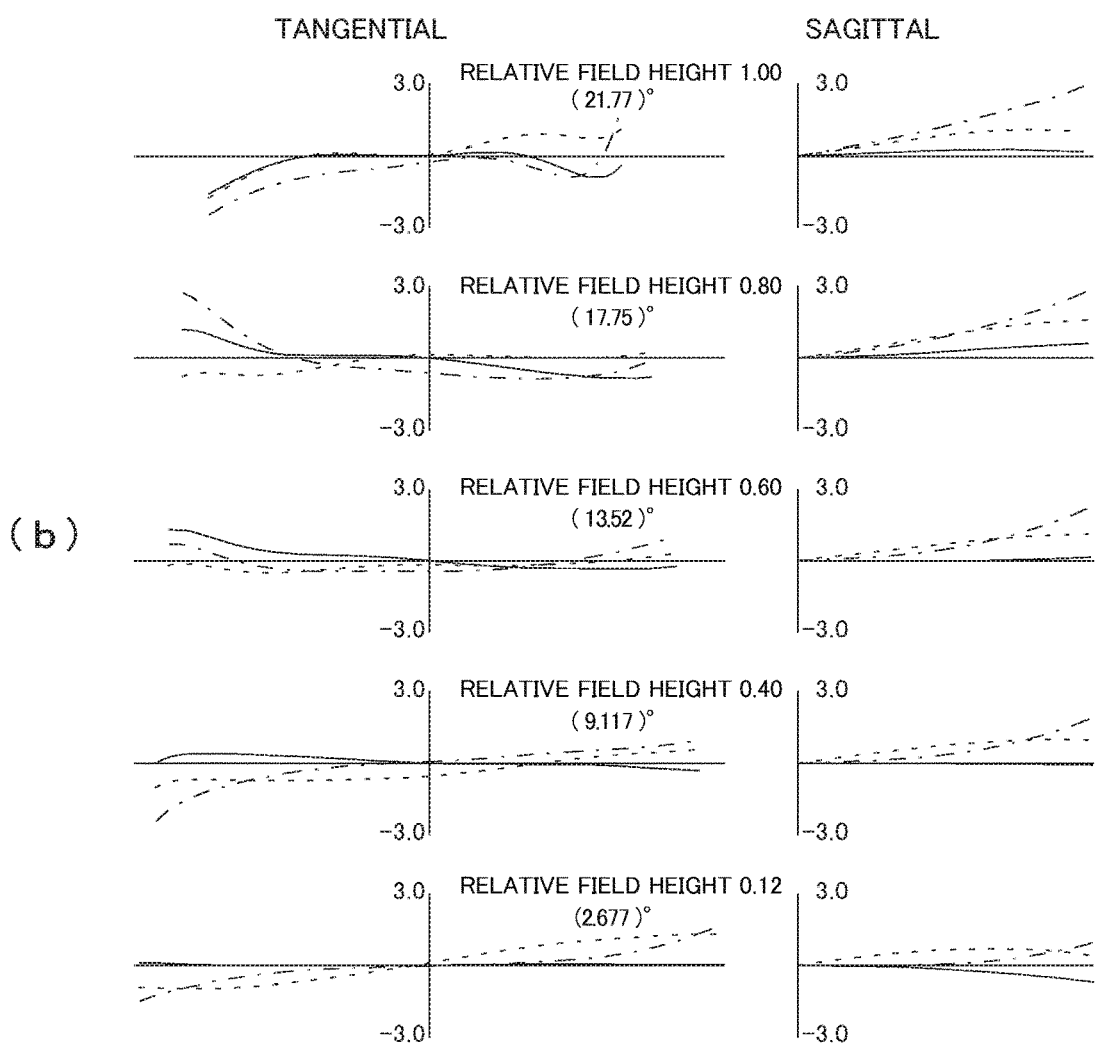

FIG. 7($a$) depicts spherical aberration, astigmatism and distortion in the standard state Pos1, and FIG. 7($b$) depicts lateral aberration diagrams at each image height in the standard state Pos1. FIG. 8($a$) depicts spherical aberration, astigmatism and distortion at the near side Pos2, and FIG. 8($b$) depicts lateral aberration diagrams at each image height in the near side Pos2. FIG. 9($a$) depicts spherical aberration, astigmatism and distortion at the infinity side Pos3, and FIG. 9($b$) depicts lateral aberration diagrams (coma aberration) at each image height in the infinity side Pos3. As shown in these drawings, various aberrations, including coma aberration, are favorably corrected at each point, so that sharp images can be projected onto the screen 6. Note that spherical aberration (in FIG. 7($a$) and the like) and coma aberration (in FIG. 7($b$) and the like) are depicted for the wavelength 650 nm (dotted line), the wavelength 550 nm (solid line), and the wavelength 450 nm (dot-dash line). Astigmatism and coma aberration are respectively depicted for tangential rays (T) and sagittal rays (S).

The main parameters of the projection optical system 10 are as follows.
Magnification: 136.0
Overall combined focal length (fa): 2.70 mm
F number: 2.5

Maximum angle of view (half angle): 77.66 degrees
Image circle (first image plane, diameter): 24.05 mm
Radius of curvature (|rm|, Condition (3)) of first reflective surface M1: 17.25 mm
Combined focal length (f2) of second lens group: 37.55 mm
Focal length (fm) of intermediate lens L9: 42.00 mm
Focal length (ff) of first focusing group LF1: 222.06
Focal length (fr) of third focusing group LF3: 22.92
Overall length (La): 195.2 mm
Effective length (Le) of first optical system: 134.3 mm
Distance (Lf) from first optical system to first reflecting surface: 60.94 mm
Distance (Lm) from first reflective surface to screen: 380.00 mm
Horizontal length (Ln) when projected onto screen: 2077 mm
Condition (1) (|rm×fa|): 46.6
Condition (2) (|rm/fa|): 6.39
Condition (4) (f2/fa): 13.9
Condition (5) (Le/La): 0.69
Condition (6) (TR): 0.183
Condition (7) (Lf/La): 0.31
Condition (8) (|fm/fa|): 15.6

Note that the overall length La of the projection optical system 10 indicates the distance along the optical axis 7 from the reducing side-surface S1 of the lens L1 that is closest to (most toward) the reducing side to the first reflective surface M1, the effective length Le of the first optical system 11 is the distance along the optical axis 7 from the reducing side-surface S1 of the lens L1 that is closest to the reducing side 2 to the magnifying side-surface S27 of the lens L15 that is closest to (most toward) the magnifying side 3, and the distance Lf from the first optical system 11 to the first reflective surface M1 is the distance along the optical axis 7 from the magnifying side-surface S27 of the lens L15 that is closest to the magnifying side 3 to the first reflective surface M1.

In the projection optical system 10, the first optical system 11 forms the first intermediate image IM1, which is formed on the first side of the optical axis 7 inside the first optical system 11 by light that is incident from the reducing side 2, into the second intermediate image IM2 on the opposite side (the second side) of the optical axis 7 at a position closer to the magnifying side 3 than the first optical system 11. The second optical system 12, which includes the first reflective surface M1 that has positive power and is positioned closer to the magnifying side 3 than the second intermediate image IM2, magnifies and projects the second intermediate image IM2 onto the screen 6. With the projection optical system 10, which includes the first optical system 11 that has the first intermediate image IM1 formed inside and which forms the first intermediate image IM1 into the second intermediate image IM2 on the magnifying side 3, that is, on the input side (reducing side) 2 of the first reflective surface M1, it is possible to reduce the length along the optical axis 7 of the second intermediate image IM2 that becomes the input of the first reflective surface M1. This means that it is possible to dispose a compact first reflective surface M1 that has high power (equivalent to refractive power), and possible to provide the projection optical system 10 which is compact, has high magnification, and a low throw ratio TR.

In addition, the first optical system 11 includes, on the magnifying side 3, the first lens system LS1 that is constructed, in order from the reducing side 2, of the first cemented lens B3 and the first positive lens L15 that is biconvex. By disposing the first positive lens L15, which is biconvex, has positive refractive power on both surfaces, and can have comparatively high refractive power on both surfaces closest to the magnifying side 3 of the first optical system 11, that is, at the magnifying side 3—end of the first optical system 11, it is possible to use a design where the light flux 8 that forms the second intermediate image IM2 mainly intersects the optical axis 7 inside the first lens system LS1 composed of the first positive lens L15 and the first cemented lens B3.

That is, it is possible to design the first optical system 11 so that the light flux 8 that reaches the second intermediate image IM2 formed on the opposite side of the optical axis 7 from the first intermediate image IM1 formed on the first side of the optical axis 7 mainly intersects the optical axis 7 in the first lens system LS1 that is disposed at the magnifying side 3 end of the first optical system 11. This means that the light flux 8 is concentrated around the optical axis 7 in the first lens system LS1, and not only the center light but also the peripheral light pass the first cemented lens B3 and the positive biconvex lens L15 that have small lens diameters. Accordingly, the second intermediate image IM2, in which aberration has been efficiently corrected by the lenses L13 to L15 included in the first lens system LS1, is formed with a comparatively small size near the magnifying side 3 of the first optical system 11.

In addition, the first optical system 11 includes the intermediate lens L9 that is spanned or intersected (crossed) by the formed first intermediate image IM1. This means that it is possible to increase the ratio Le/La indicating the proportion of the overall length La of the projection optical system 10 occupied by the first optical system 11 that is a refractive optical system, and possible to dispose the fifteen lenses L1 to L15 in the first optical system 11 according to the present embodiment. Accordingly, it is possible to reduce the overall length La of the projection optical system 10, to reduce the throw ratio TR, and to also improve the quality of the images projected onto the screen 6. With the projection optical system 10 according to the present embodiment, in addition to satisfying each of Conditions (5) to (10) and being a projection optical system 10 with a short overall length La, it is possible to set the proportion occupied by the first optical system 11, which is a refractive optical system, at 50% or higher and to project images in which aberration has been favorably corrected with a throw ratio TR of 0.19 or lower, so as to be able to project images with the projection optical system 10 and the projector 1 including the projection optical system 10 disposed close to the screen 6.

Accordingly, with the projection optical system 10, since it is possible to form the second intermediate image IM2 closer to the first optical system 11 and to also reduce the diameter of the magnifying side 3 of the first optical system 11, it is possible to dispose the first reflective surface M1 that has high power (a small radius of curvature rm and a small (absolute) focal length) close to the first optical system 11. In the projection optical system 10 according to the present embodiment, the radius of curvature rm of the first reflective surface M1 satisfies Conditions (1), (2) and (3), the proportion of the overall power of the projection optical system 10 occupied by the power of the first reflective surface M1 is sufficiently high, and the power of the first reflective surface M1 itself is also sufficiently high.

Out of the lenses L13 to L15 of the first lens system LS1, the lens with the largest effective diameter is the lens L13 closest to the reducing side, and the effective diameter D23 of the reducing side-surface S23 is 17 mm. On the other hand, the lens with the largest effective diameter in the second lens group G2 is the lens L10 closest to the reducing side, and the effective diameter D17 of the reducing side-surface S17 is 25.3 mm. Accordingly, in the second lens group G2, the diameter (effective diameter) of the first lens system LS1 disposed closest to the magnifying side 3 is small, so that it is possible to prevent interference with the projected light 19 projected from the first reflective surface M1 toward the screen 6. This makes it possible to provide the projector 1 that is compact and is capable of projecting large images.

Also, since the light flux 8 that forms the second intermediate image IM2 intersects the optical axis 7 mostly inside the first lens system LS1, the positions where the light flux 8 that forms the second intermediate image IM2 passes the first cemented lens B3 and the first positive lens L15 are dispersed so as to be centered on the optical axis 7, which makes it easy to correct aberration using the lenses L13 to L15. This means that with the first lens system LS1 that includes the first cemented lens B3, it is possible to favorably correct not only chromatic aberration but also curvature of field and astigmatism.

In addition, in the first optical system 11, by selecting the refractive power of the second lens group G2 that forms the second intermediate image IM2 from the first intermediate image IM1 so as to satisfy Condition (4), it is possible, in the projection optical system 10 where the first reflective surface M1 is provided with high power, to achieve a sufficiently high refractive power for aberration correction in the second lens group G2 and to also give the first lens group G1 sufficient refractive power for aberration correction. Accordingly, the first optical system 11 has a balanced aberration correction ability. It is therefore possible to provide the projection optical system 10 and the projector 1 that are capable of projecting high-quality images onto the screen 6.

In addition, the first cemented lens B3 of the first lens system LS1 has negative refractive power. The light flux 8 is concentrated and intersects the optical axis 7 in the first lens system LS1, which is suited to correcting aberration, but increases tolerance sensitivity (error sensitivity, effectiveness) to aberration correction caused by the individual lenses. That is, the projection optical system 10 has a design where out of the first optical system 11, differences in aberration correcting performance are likely to happen due to manufacturing tolerances of the respective lenses of the first lens system LS1 and tolerances at the time of assembly. For this reason, by providing the first cemented lens B3 with negative refractive power that is different to the first positive lens L15, it is possible to reduce the tolerance sensitivity of the first lens system LS1 and provide a projection optical system 10 capable of projecting high-quality images more stably.

The magnifying side-surface S25 of the first cemented lens B3, which faces the convex surface S26 on the reducing side 2 of the (biconvex) first positive lens L15 in the first lens system LS1, is concave on the magnifying side 3. The radii of curvature (curvature) of the surfaces S25 and S26 are oriented in the same direction, so that the interval between the surfaces S25 and S26, that is, the interval variation in the direction perpendicular to the optical axis 7, does not greatly change. Accordingly, it is possible to further reduce tolerance sensitivity caused by the combination of the lenses L13 to L15 that construct the first lens system LS1 and possible to provide the projection optical system 10 to project high-quality images more stably.

In the first optical system 11, the first intermediate image IM1 is formed so as to across the intermediate lens L9. By disposing the intermediate lens L9 so as to coincide with the first intermediate image IM1, it is possible to make more effective use of the space (effective length Le) of the first optical system 11, and thereby provide an even more compact projection optical system 10. The first intermediate image IM1 is formed to be inclined to approach the reducing side 2 as the distance from the optical axis 7 increases. That is, the bottom end IM1-$b$, which is the center light of the light flux 8 and is close to the optical axis 7 of the first intermediate image IM1, is positioned outside the intermediate lens L9 on the magnifying side 3 and the top end IM1-$t$, which is peripheral light of the light flux 8 that is distant from the optical axis 7 of the first intermediate image IM1, is positioned outside the intermediate lens L9 on the reducing side 2.

In the projection optical system 10, the first intermediate image IM1 is an image that is subjected to further aberration correction by the second lens group G2, so that even if the first intermediate image IM1 spans or crosses the intermediate lens L9 and is influenced by the surfaces of the intermediate lens L9, it is possible to correct this with the second lens group G2. Accordingly, by having the first intermediate image IM1 span or cross the intermediate lens L9, it is possible to dispose a larger number of lenses in the effective length Le of the first optical system 11 and thereby give priority to improvement of aberration correction performance. The first intermediate image IM1 is inclined toward the reducing side 2, and peripheral light of the first intermediate image IM1 that is magnified and projected a greater distance from the projection optical system 10 can be subjected to aberration correction using the intermediate lens L9 in addition to the second lens group G2. Accordingly, it is possible to provide the projection optical system 10 and the projector 1 that project higher quality images onto the screen 6.

Note that the lower limit of Condition (1) may be 45.5 and the upper limit may be 49.0. The lower limit of Condition (2) may be 6.25 and the upper limit may be 6.65. It is possible to reduce sag in the lens L8, which makes it easy to manufacture the lens L8. The lower limit of Condition (3) may be 16.5 and the upper limit may be 18.5. The lower limit of Condition (4) may be 13.0, and the upper limit may be 15.0. The sag of the lens L8 can be also reduced by such conditions, which makes the lens L8 easy to manufacture. The sag of the lens L8 can be further reduced by combining Condition (1) and at least two conditions out of Condition (2), Condition (3) and Condition (4), which also makes the lens L8 easy to manufacture.

Figure 10:
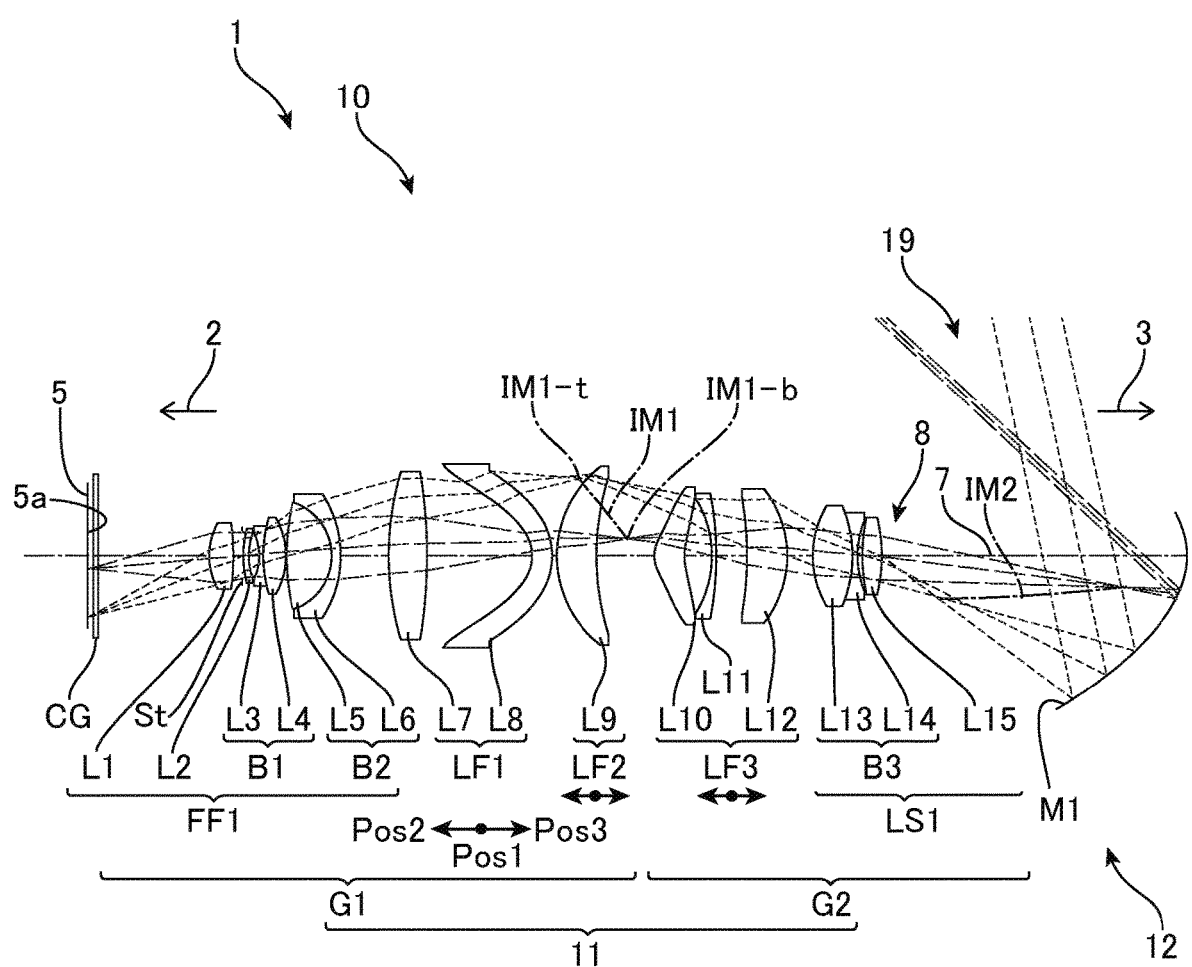
FIG. 10 is a diagram that depicts a different example configuration of a projector and a projection optical system.

FIG. 10 depicts another example of a projector. This projector 1 also includes a projection optical system 10 that projects from an image plane first image plane) 5$a$ of a light modulator (light valve) 5 on the reducing side 2 onto a screen or wall surface (second image plane) on the magnifying side 3. The projection optical system 10 includes a first optical system 11, which includes a plurality of lenses, and a second optical system 12, which includes a first reflective surface M1 that has positive power. The first optical system 11 forms the first intermediate image IM1, which is formed inside the first optical system 11 by light that is incident from the reducing side 2, into the second intermediate image IM2 that is closer to the magnifying side 3 than the first optical system 11 and the first reflective surface M1 projects the second intermediate image IM2 onto the second image plane as images (the final images).

The first optical system 11 also includes a first lens group first refractive optical system) G1 disposed on (located on) the reducing side 2 (input side) and a second lens group (second refractive optical system) G2 disposed on the magnifying side (output side) 3 of the first lens group G1. The first lens group G1 includes the intermediate lens L9 at a position closest to the magnifying side 3 and the first intermediate image IM1 is formed to across the intermediate lens L9.

FIGS. 11, 12, and 13 show data on the respective elements in the projection optical system 10. The first lens group G1 includes lenses L1 to L9, and the basic configurations of the respective lenses are the same as the projection optical system 10 depicted in FIG. 1. The second lens group G2 includes the lenses L10 to L15, and aside from the lens L11 being a negative meniscus lens that is convex on the magnifying side 3 and the lens L12 being a positive meniscus lens that is convex on the magnifying side, the basic configurations of the respective lenses are the same as above. Accordingly, the second lens group G2 includes, at a position closest to the magnifying side 3, a first lens system LS1 that is composed of a first cemented lens B3 and a first positive lens L15. This projection optical system 10 is also an internal focus type and includes three focusing groups LF1 to LF3.

FIG. 14 shows the distances d10, d14, d16, and d22 that indicate the positional relationships between the focusing groups LF1 to LF3 in the standard state (Pos1), at the near side (Pos2), and at the infinity side (Pos3). The focusing groups LF1, LF2, and LF3 each move from the reducing side 2 toward the magnifying side 3 as the focal length, that is, the distance between the mirror M1 and the screen 6, increases from the near side via the standard state to the infinity side. When doing so, the respective focusing groups move individually by different distances. The smallest moved distance is by the second focusing group LF2, which includes the intermediate lens L9 that is spanned by the formed first intermediate image IM1 and has the largest effect during focusing (i.e., greatest tolerance sensitivity).

Figure 15:
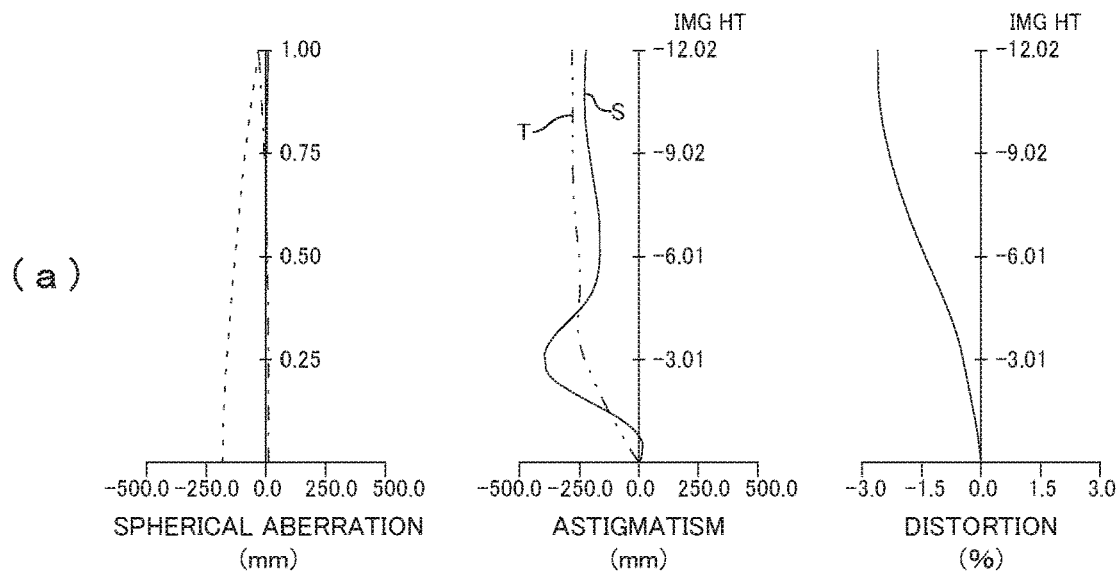
FIG. 15 is graphs that show aberrations in a standard state.
Figure 15:
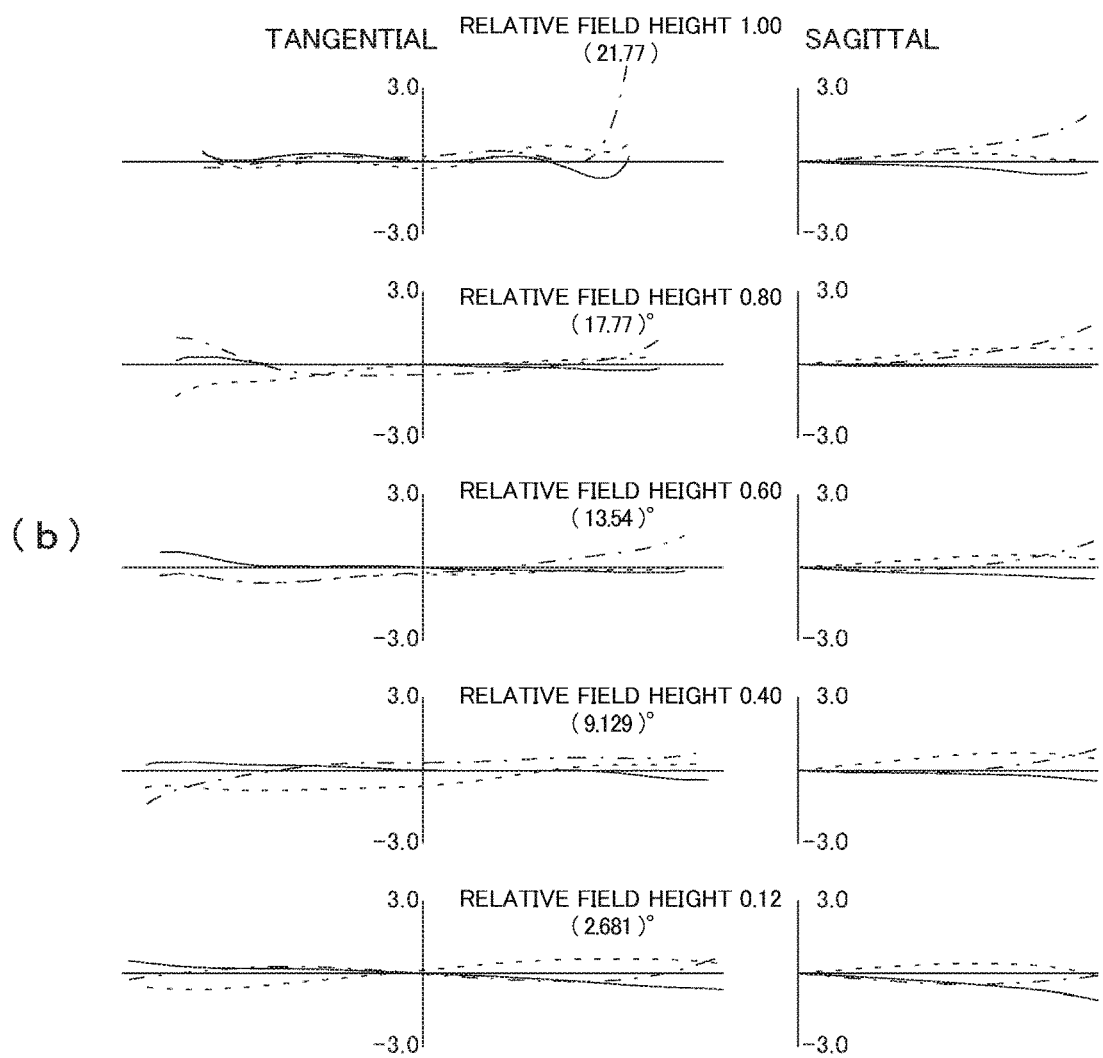
Figure 16:
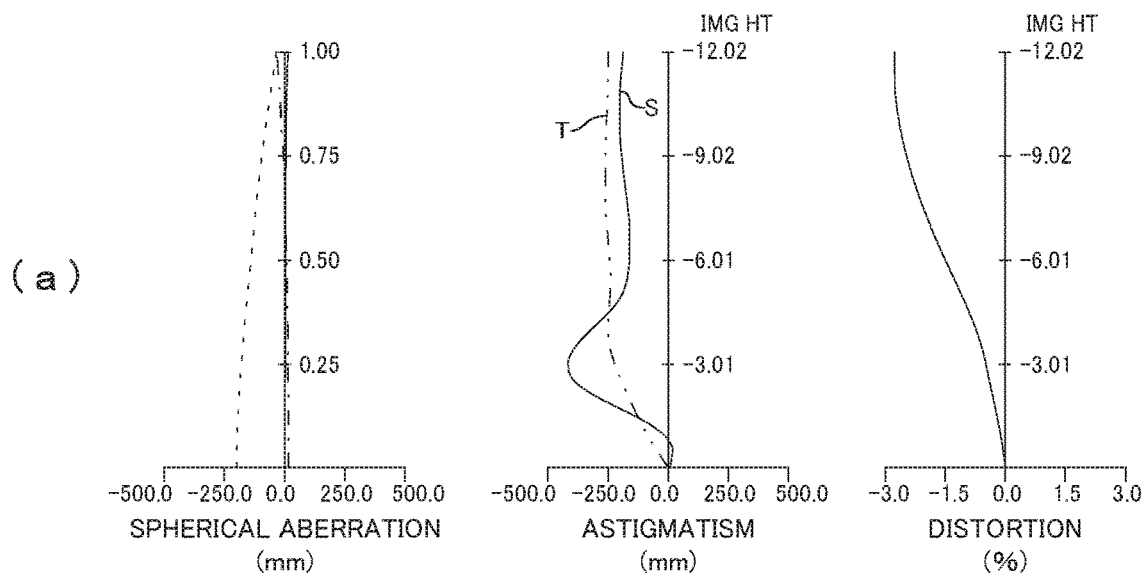
FIG. 16 is graphs that show aberrations at a near side.
Figure 16:
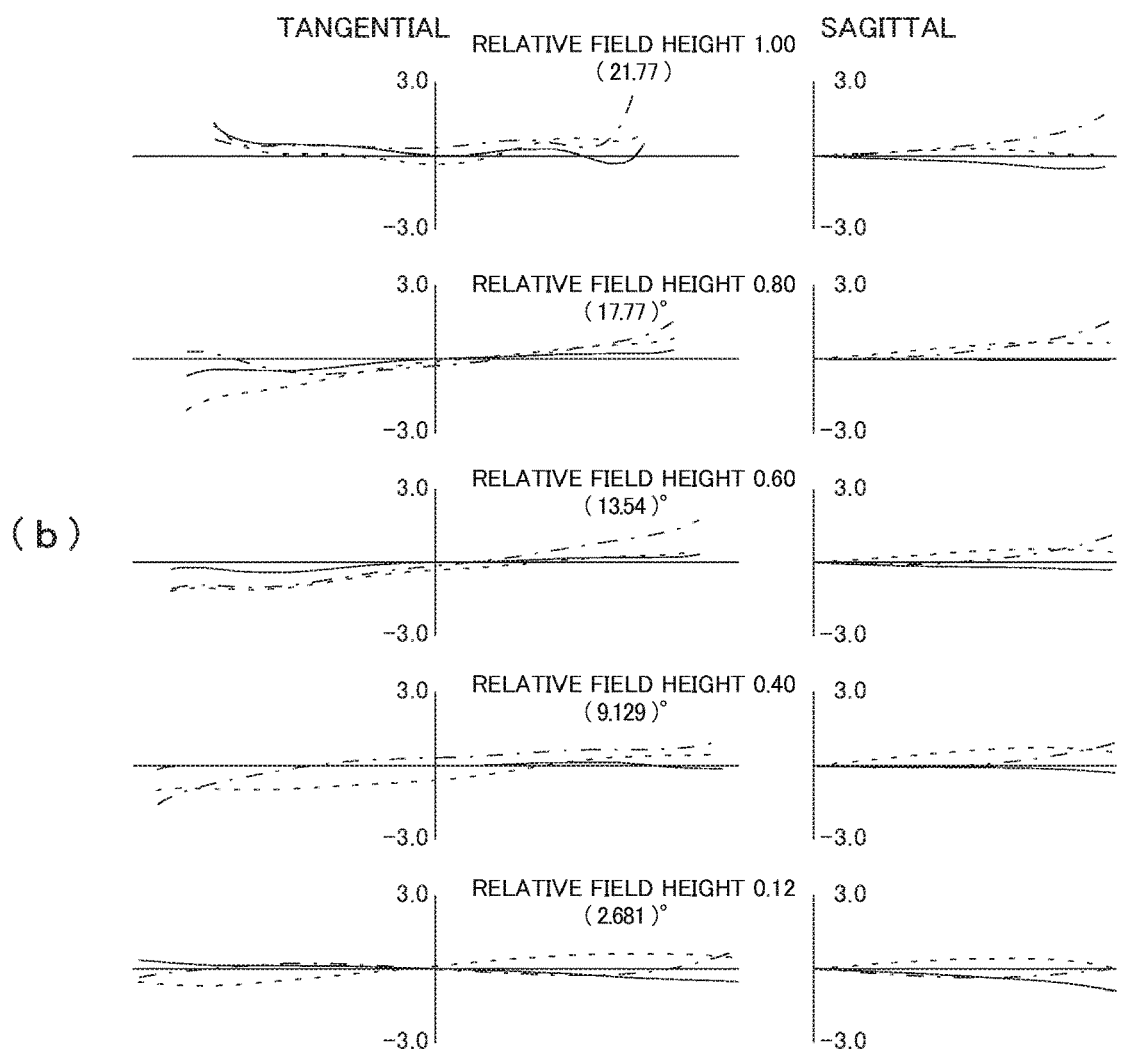
Figure 17:
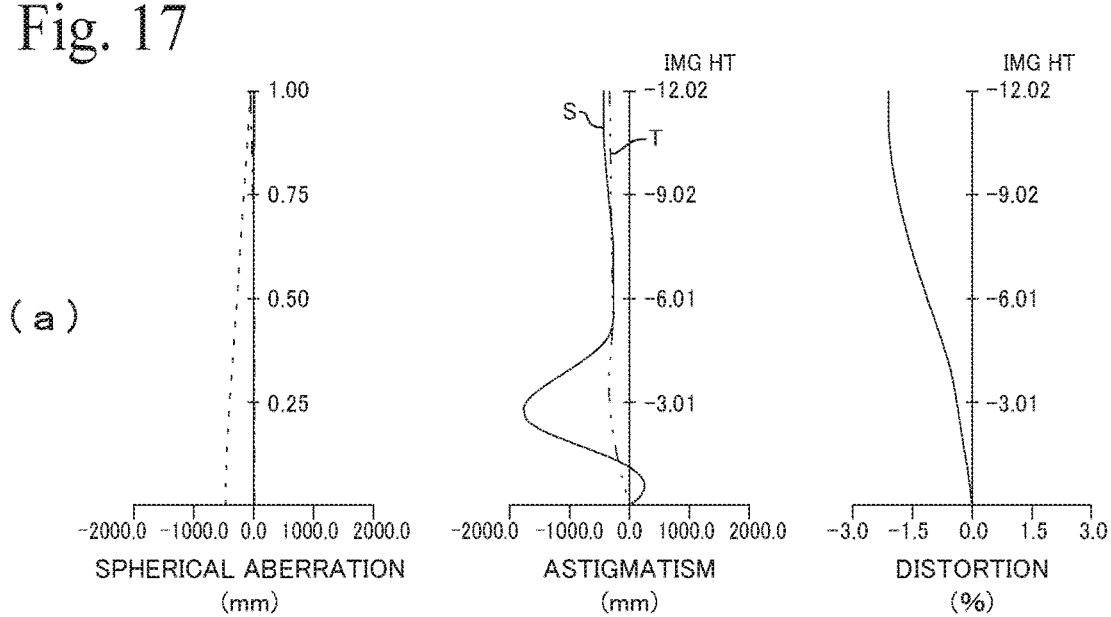
FIG. 17 is graphs that show aberrations at an infinity side.
Figure 17:
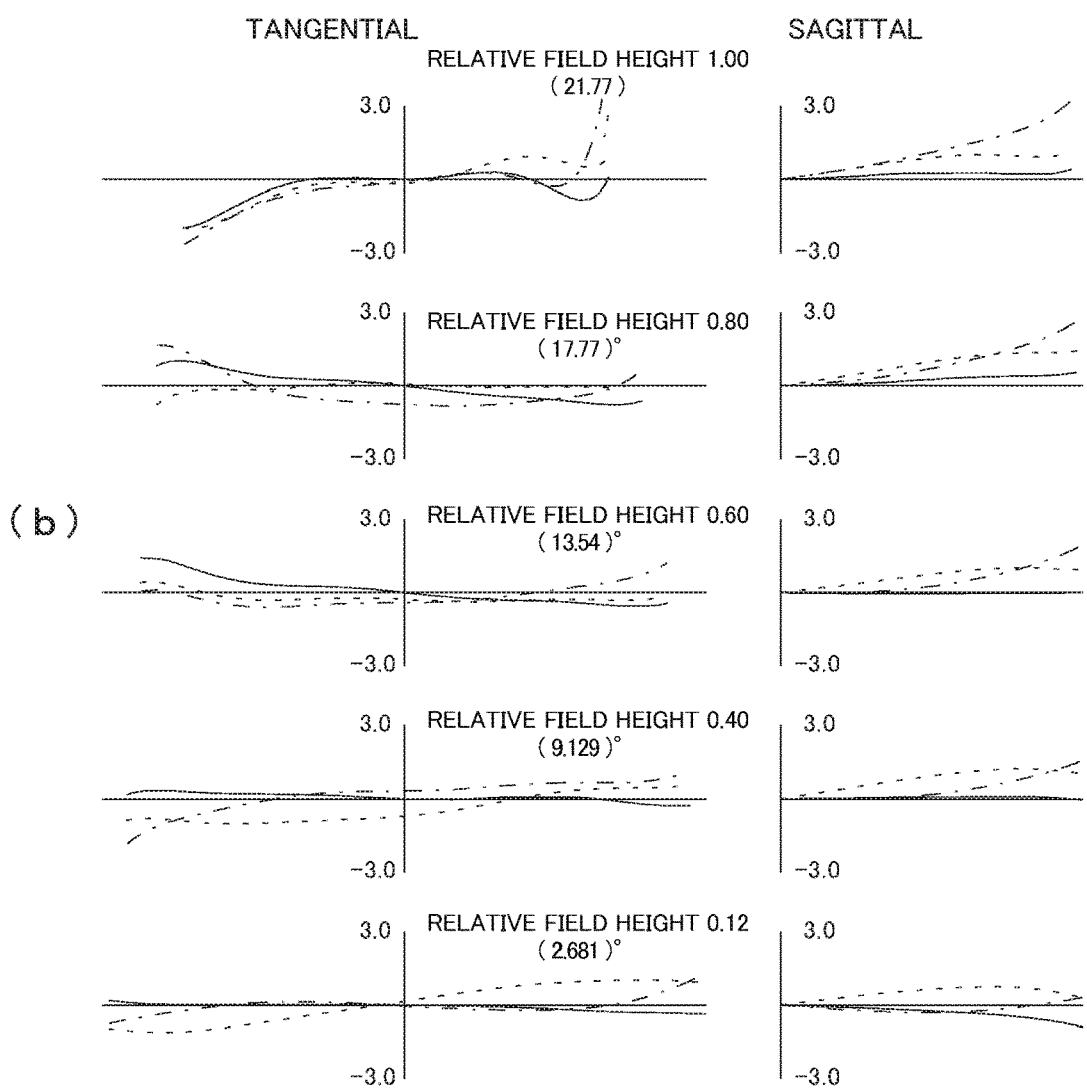

FIG. 15(a) depicts spherical aberration, astigmatism and distortion in the standard state Pos1, and FIG. 15(b) depicts lateral aberration diagrams at each image height in the standard state Pos1. FIG. 16(a) depicts spherical aberration, astigmatism and distortion at the near side Pos2, and FIG. 16(b) depicts lateral aberration diagrams at each image height in the near side Pos2. FIG. 17(a) depicts spherical aberration, astigmatism and distortion at the infinity side Pos3, and FIG. 17(b) depicts lateral aberration diagrams at each image height in the infinity side Pos3. As depicted in these drawings, with this projection optical system 10 also, various aberrations, including coma aberration, are favorably corrected at each position, so that sharp images can be projected onto the screen 6.

The main parameters of the projection optical system 10 according to the present embodiment are as follows.
Magnification: 137.4
Overall combined focal length (fa): 2.70 mm
F number: 2.5
Maximum angle of view (half angle): 77.75 degrees
Image circle (first image plane, diameter): 24.05 mm
Radius of curvature (|rm|, Condition (3)) of first reflective surface M1: 15.8 mm
Combined focal length of second lens group (f2): 47.29 mm
Focal length of intermediate lens L9 (fm): 58.53 mm
Focal length (ff) of first focusing group LF1: 111.12
Focal length (fr) of third focusing group LF3: 22.25
Overall length (La): 195.4 mm
Effective length (Le) of first optical system: 134.4 mm
Distance from first optical system to first reflecting surface (Lf): 60.94 mm
Distance from first reflective surface to screen (Lm): 380.00 mm
Horizontal length (Ln) when projected onto screen: 2077 mm
Movement distance Di1: 0.24 mm
Movement distance Di2: 0.08 mm
Movement distance Di3: 0.39 mm
Condition (1) (|rm×fa|): 42.7
Condition (2) (|rm/fa|): 5.85
Condition (4) (f2/fa): 17.5
Condition (5) (Le/La): 0.69
Condition (6) (TR): 0.183
Condition (7) (Lf/La): 0.31
Condition (8) (|fm/fa|): 21.68
Largest effective diameter in first lens system LS1: 18.10 mm (surface S23 of L13)
Largest effective diameter in second lens group G2: 25.10 mm (surface S17 of L10)

In this projection optical system 10 also, the first optical system 11 forms the first intermediate image IM1, which is internally formed on the first side of the optical axis 7, into the second intermediate image IM2 on the opposite side (the second side) of the optical axis 7 at a position on the magnifying side 3 of the first optical system 11. The first reflective surface M1 magnifies and projects the second intermediate image IM2 onto the screen 6. In addition, the first optical system 11 includes, on the magnifying side 3, the first lens system LS1 which is constructed, in order from the reducing side 2, of the first cemented lens B3 and the first positive lens L15 that is biconvex. Accordingly, since it is possible to form the second intermediate image IM2, in which aberration has been efficiently corrected by the lenses L13 to L15 included in the first lens system LS1 with a comparatively small size near the magnifying side 3 of the first optical system 11 and reduce the magnifying side 3 diameter of the first optical system 11, it is possible to dispose the first reflective surface M1 that has high power (a small radius of curvature rm and a short absolute focal length) close to the first optical system 11.

In the projection optical system 10 according to the present embodiment, the radius of curvature rm of the first reflective surface M1 satisfies each of Conditions (1), (2) and (3), the proportion of the overall power of the projection optical system 10 occupied by the power of the first reflective surface M1 is sufficiently high, and the power of the first reflective surface M1 itself is also sufficiently high. In the second lens group G2, the diameter (effective diameter) of the first lens system LS1 disposed closest to the magnifying side 3 is small, so that it is possible to prevent interference with the projected light 19 projected from the first reflective surface M1 toward the screen 6. This makes it possible to provide the projector 1 that is compact and is capable of projecting large images.

The projection optical system 10 according to the present embodiment also uses a design where the first intermediate image IM1 is formed across (spans) the intermediate lens L9, satisfies each of Conditions (5) to (10), and while being a projection optical system 10 with a short overall length La, enables the proportion of the first optical system 11 that is a refractive optical system to be set at 50% or higher. This means that it is possible to project images in which aberration has been favorably corrected with the projection optical system 10 and the projector 1 that includes the projection optical system 10 disposed close to the screen 6, with a throw ratio TR of 0.19 or below.

In the first optical system 11, the refractive power of the second lens group G2 is selected to satisfy Condition (4), so that it is possible to achieve sufficiently high refractive power for correcting aberration in the second lens group G2 and to also give the first lens group G1 refractive power for correcting aberration. Accordingly, it is possible to correct aberration in a balanced manner in the first optical system 11 also, and possible to provide a projection optical system 10 and a projector 1 capable of projecting high-quality images onto the screen 6.

The first cemented lens B3 of the first lens system LS1 has negative refractive power, and the magnifying side-surface S25 is concave on the magnifying side 3. Accordingly, tolerance sensitivity caused by the combination of lenses L13 to L15 that construct the first lens system LS1 can be reduced, which means that it is possible to provide a projection optical system 10 which projects high-quality images more stably.

In addition, the first optical system 11 also includes the intermediate lens L9 that the first intermediate image IM1 is formed so as to across, and by making more effective use of the effective length Le of the first optical system 11, it is possible to provide a more compact projection optical system 10 and projector 1 that project higher-quality images onto the screen 6.

Figure 18:
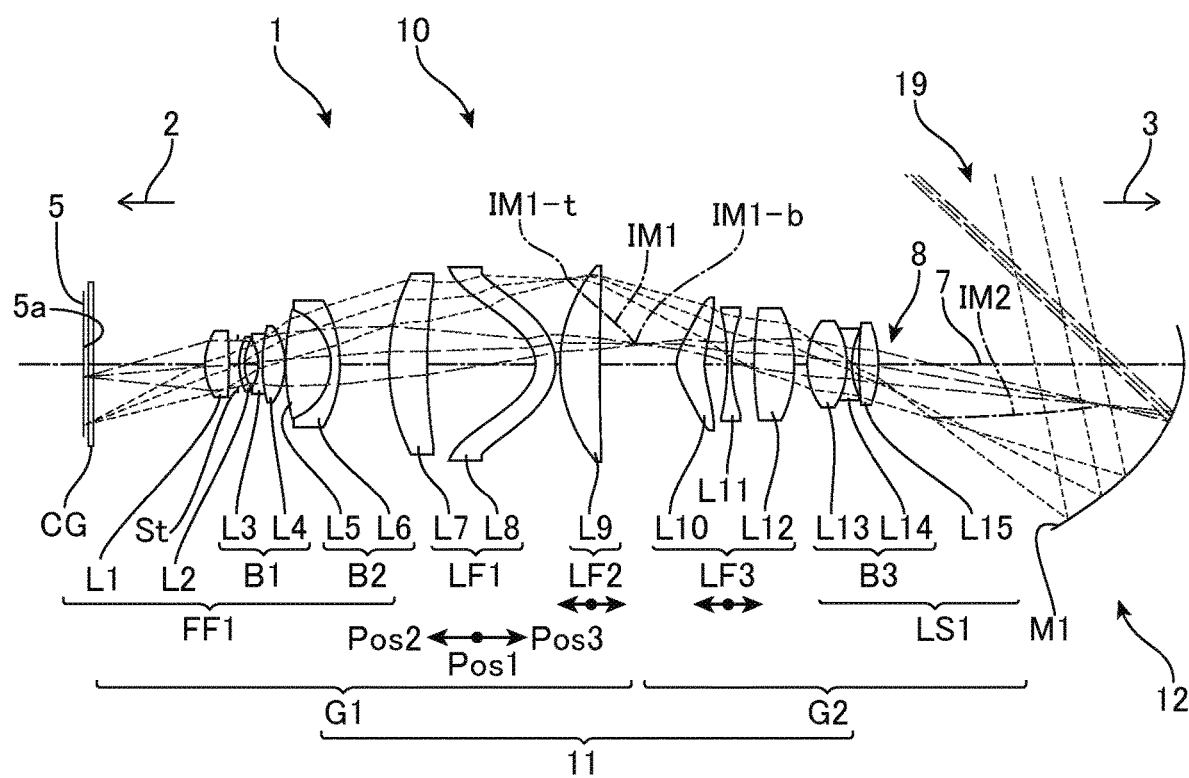
FIG. 18 is a diagram that depicts a different example configuration of a projector and a projection optical system.

FIG. 18 shows yet another example of the projector. This projector 1 also includes a projection optical system 10 that projects from an image plane (first image plane) 5a of a light modulator (light valve) 5 on the reducing side 2 onto a screen or wall surface (second image plane) on the magnifying side 3. The projection optical system 10 includes a first optical system 11, which includes a plurality of lenses, and a second optical system 12, which includes a first reflective surface M1 that has positive refractive power. The first optical system 11 forms a first intermediate image IM1, which is formed inside the first optical system 11 by light that is incident from the reducing side 2, into the second intermediate image IM2 that is closer to the magnifying side 3 than the first optical system 11 and the first reflective surface M1 projects the second intermediate image IM2 onto the second image plane as images (the final images).

As well as the embodiments described above, the first optical system 11 includes a first lens group (first refractive optical system) G1 disposed on the reducing side 2 (input side) and a second lens group second refractive optical system) G2 disposed on the magnifying side (output side) 3 of the first lens group G1. The first lens group G1 includes the intermediate lens L9 at a position closest to the magnifying side 3 and the first intermediate image IM1 is formed across the intermediate lens L9.

FIGS. 19, 20, and 21 depict data on the various elements of the projection optical system 10. The first lens group G1 includes lenses L1 to L9 and the basic configurations of the respective lenses are the same as the projection optical system 10 depicted in FIG. 1. The second lens group G2 includes the lenses L10 to L15 and the basic configurations of the respective lenses are the same as in the projection optical system 10 depicted in FIG. 1. The first optical system 11 includes, on the magnifying side 3, the first lens system LS1 composed of the first cemented lens B3 and the first positive lens L15. This projection optical system 10 is also an internal focus type and includes focusing groups LF1 to LF3.

FIG. 22 depicts the distances d10, d14, d16, and d22 that indicate the positional relationships between the focusing groups LF1 to LF3 in the standard state (Pos1), at the near side (Pos2), and at the infinity side (Pos3). The focusing groups LF1, LF2, and LF3 each move from the reducing side 2 toward the magnifying side 3 as the focal length, that is, the distance between the mirror M1 and the screen 6, increases from the near side via the standard state to the infinity side. When doing so, the respective focusing groups move by different distances. The smallest moved distance is by the second focusing group LF2, which includes the intermediate lens L9 that is crossed by the formed first intermediate image IM1 and has the largest effect during focusing (i.e., greatest tolerance sensitivity).

Figure 23:
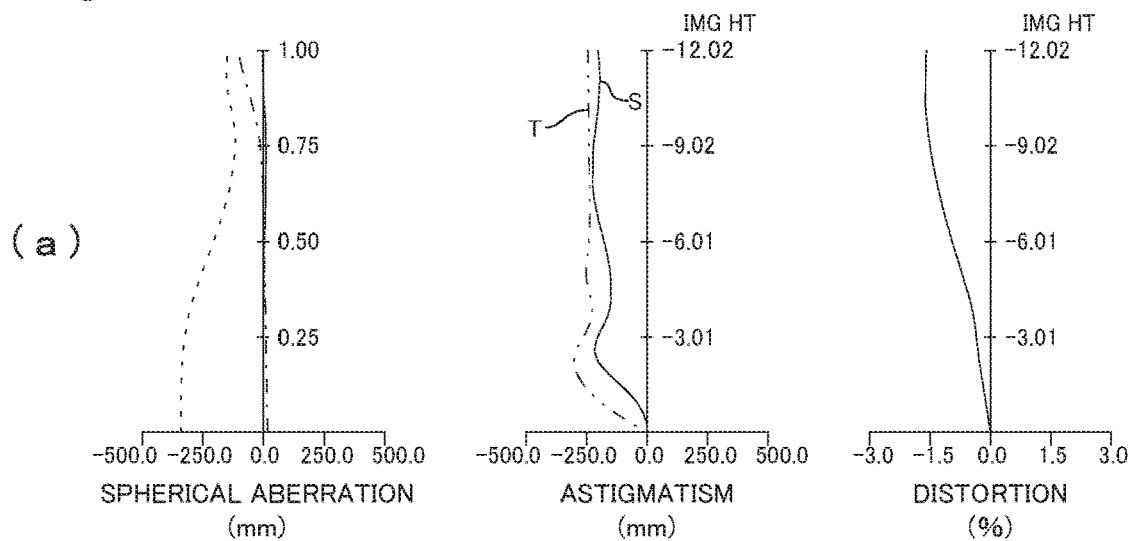
FIG. 23 is graphs that show aberrations in a standard state.
Figure 23:
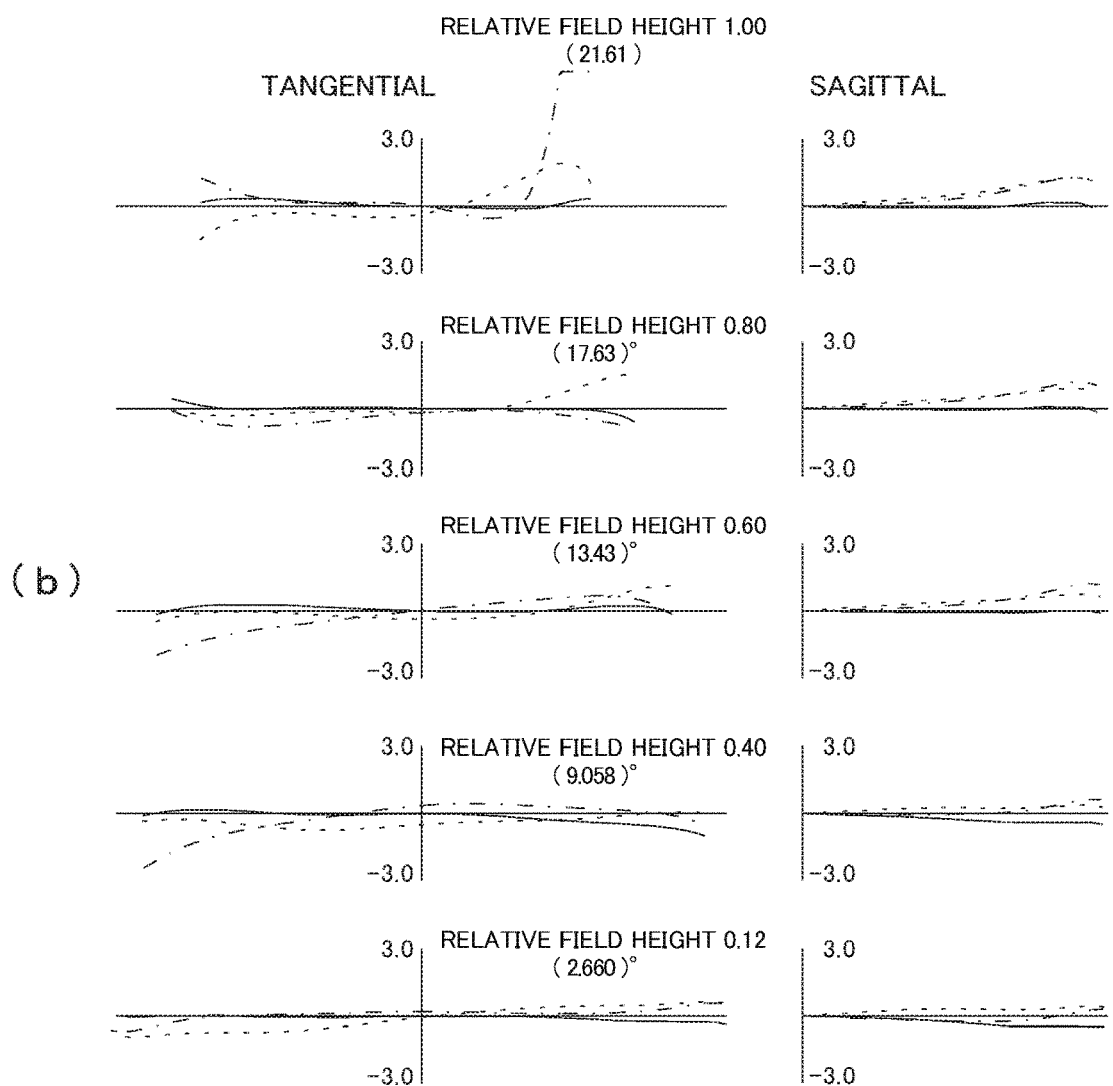
Figure 24:
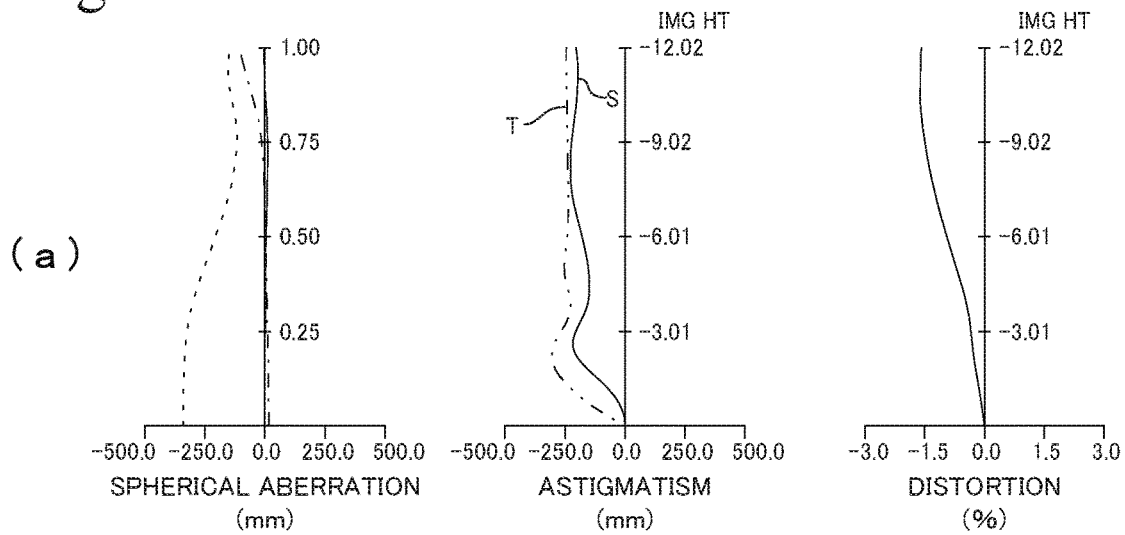
FIG. 24 is graphs that show aberrations at a near side.
Figure 24:
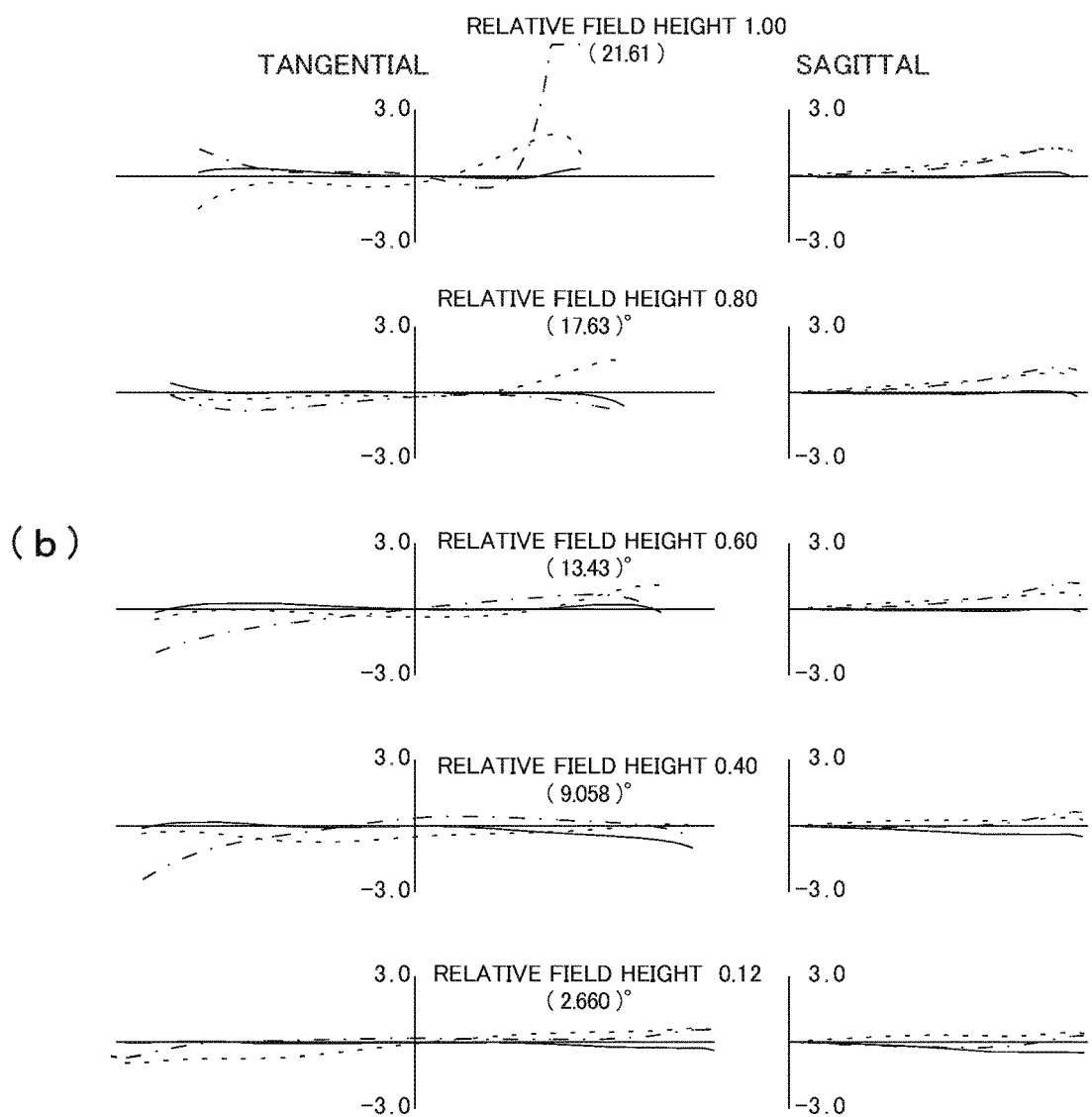
Figure 25:
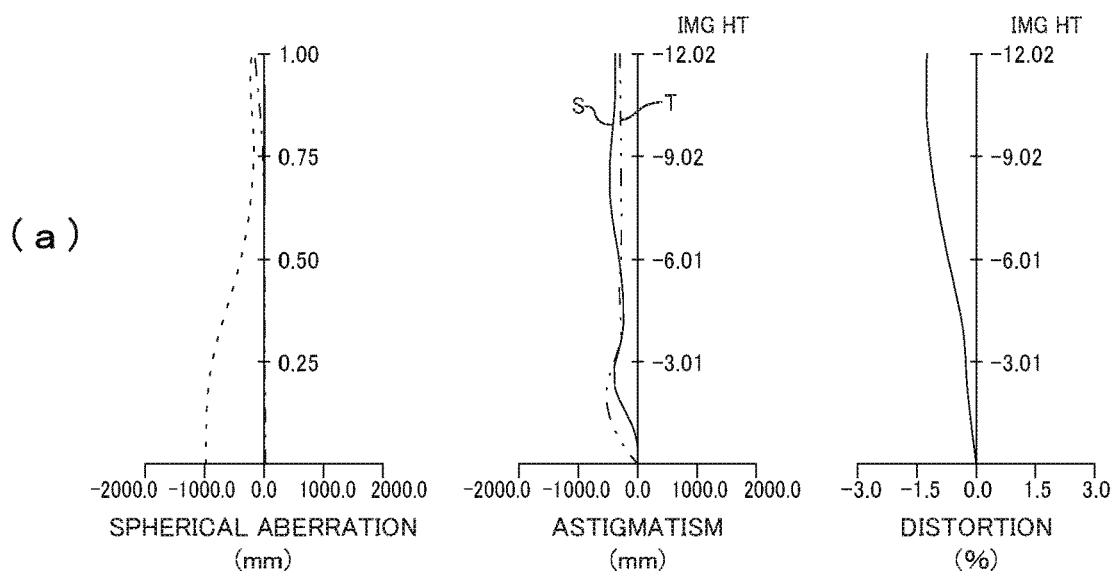
FIG. 25 is graphs that show aberrations at an infinity side.
Figure 25:
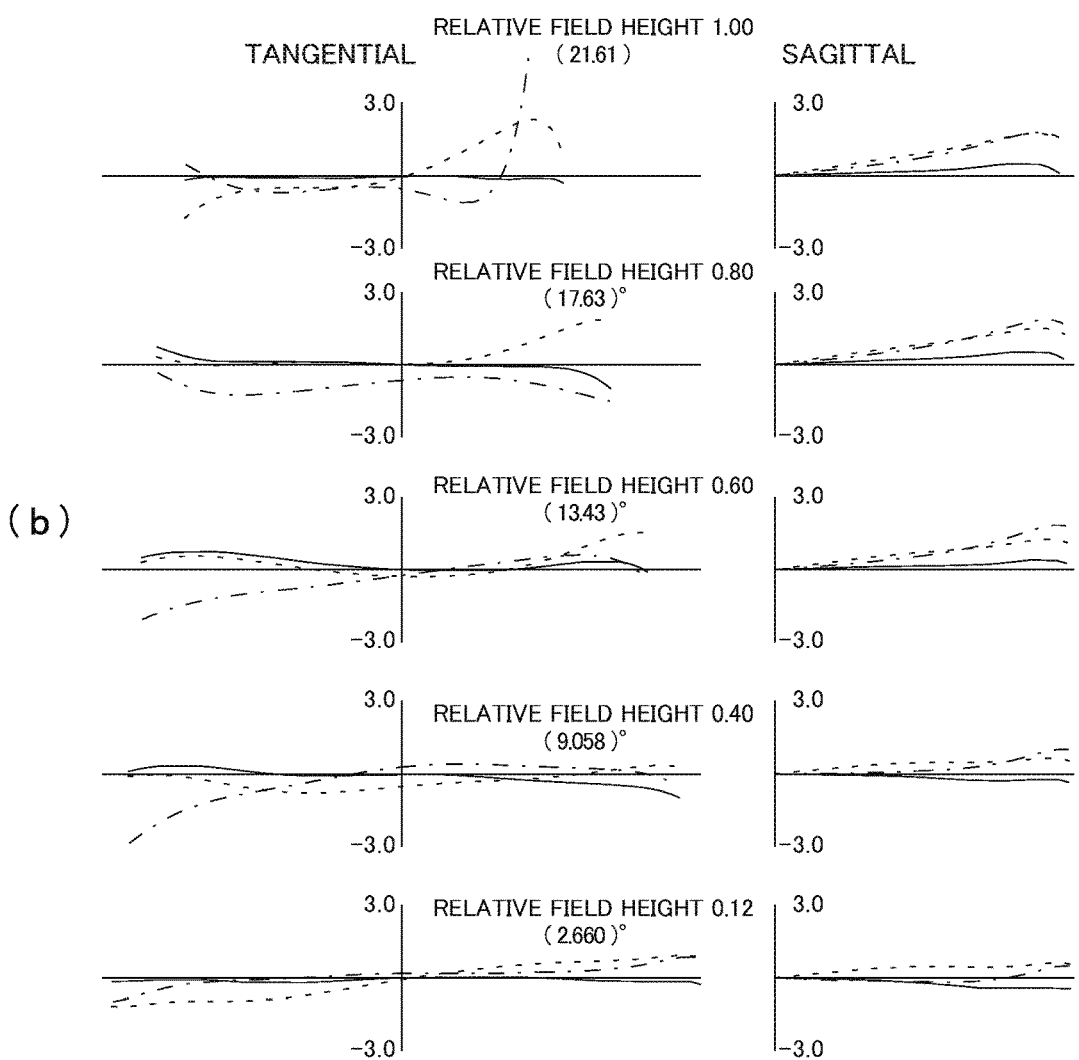

FIG. 23($a$) depicts spherical aberration, astigmatism and distortion in the standard state Pos1, and FIG. 23($b$) depicts lateral aberration diagrams at each image height in the standard state Pos1. FIG. 24($a$) depicts spherical aberration, astigmatism and distortion at the near side Pos2, and FIG. 24($b$) depicts lateral aberration diagrams at each image height in the near side Pos2. FIG. 25($a$) depicts spherical aberration, astigmatism and distortion at the infinity side Pos3, and FIG. 25($b$) depicts lateral aberration diagrams at each image height in the infinity side Pos3. As depicted in these drawings, with the projection optical system 10 according to the present embodiment also, various aberrations, including coma aberration, are favorably corrected, so that sharp images can be projected onto the screen 6.

The main parameters of the projection optical system 10 according to the present embodiment are as follows.
Magnification: 136.8
Overall combined focal length (fa): 2.70 mm
F number: 2.5
Maximum angle of view (half angle): 77.73 degrees
Image circle (first image plane, diameter): 24.05 mm
Radius of curvature (|rm|, Condition (3)) of the first reflective surface M1: 21.2 mm
Combined focal length of the second lens group (f2): 27.45 mm
Focal length of intermediate lens L9 (fm): 44.11 mm
Focal length (ff) of first focusing group LF1: 273.73
Focal length (fr) of third focusing group LF3: 22.70
Overall length (La): 195.3 mm
Effective length (Le) of first optical system: 134.4 mm
Distance from first optical system to first reflecting surface (Lf): 60.94 mm
Distance from first reflective surface to screen (Lm): 380.00 mm
Horizontal length (Ln) when projected onto screen: 2077 mm
Movement distance Di1: 0.44 mm
Movement distance Di2: −0.03 mm
Movement distance Di3: 0.56 mm
Condition (1) (|rm×fa|): 57.2
Condition (2) (|rm/fa|): 7.85
Condition (4) (f2/fa): 10.2
Condition (5) (Le/La): 0.69
Condition (6) (TR): 0.183
Condition (7) (Lf/La): 0.31
Condition (8) (|fm/fa|): 16.33
Largest effective diameter in first lens system LS1: 15.50 mm (surface S23 of L13)
Largest effective diameter in second lens group G2: 24.20 mm (surface S17 of L10)

In this projection optical system 10 also, the first optical system 11 forms the first intermediate image IM1, which is internally formed on the first side of the optical axis 7, into the second intermediate image IM2 on the opposite side (the second side) of the optical axis 7 on the magnifying side 3 of the first optical system 11. The first reflective surface M1 magnifies and projects the second intermediate image IM2 onto the screen 6. In addition, the first optical system 11 includes, on the magnifying side 3, the first lens system LS1 which is constructed, in order from the reducing side 2, of the first cemented lens B3 and the first positive lens L15 which is biconvex. Accordingly, this projection optical system 10 also satisfies each of Conditions (1) to (10) and makes it possible to provide the projection optical system 10 and the projector 1 that are compact and are capable of projecting high-quality images from a position close to the screen 6.

In addition, the first optical system 11 includes the intermediate lens L9 that the first intermediate image IM1 is formed so as to across, and by making more effective use of the effective length Le of the first optical system 11, it is possible to provide a more compact projection optical system 10 and projector 1 that project higher-quality images onto the screen 6.

The invention claimed is:

1. A projection optical system that projects from a first image plane on a reducing side onto a second image plane on a magnifying side, comprising:
   a first optical system that includes a plurality of lenses and forms a first intermediate image formed inside the first optical system by light that is incident from the reducing side, into a second intermediate image on the magnifying side of the first optical system, the first intermediate image being formed on a first side of an optical axis and the second intermediate image being formed on a second side of the optical axis; and
   a second optical system including a first reflective surface with positive power located on the magnifying side of the second intermediate image,
   wherein the first optical system includes:
      an intermediate lens, the first intermediate image being formed so as to be inclined so as to approach the reducing side as a distance from the optical axis increases and to cross the intermediate lens;
      a first lens group that includes the intermediate lens and multiple additional lenses, wherein the multiple additional lenses of the first lens group are located on the reducing side of the intermediate lens; and
      a second lens group that is located on the magnifying side of the intermediate lens, and
   a combined focal length fa of the projection optical system and a combined focal length f2 of the second lens group satisfy the following condition $8 < f2/fa < 20$.

2. The projection optical system according to claim 1, wherein the intermediate lens is a lens that moves for focusing.

3. The projection optical system according to claim 2, wherein a bottom end of the first intermediate image that is close to the optical axis is located outside the intermediate lens on the magnifying side, a top end of the first intermediate image that is distant from the optical axis is located outside the intermediate lens on the reducing side, and the intermediate lens moves between the bottom end and the top end for focusing.

4. The projection optical system according to claim 1, wherein the intermediate lens is a positive meniscus lens that is convex on the reducing side.

5. The projection optical system according to claim 4, wherein the first optical system includes a front-side negative meniscus lens that is convex on the magnifying side and is disposed adjacent to the reducing side of the intermediate lens.

6. The projection optical system according to claim 1, wherein a focal length fm of the intermediate lens and a combined focal length fa of the projection optical system satisfy a following condition $10 < |fm/fa| < 30$.

7. The projection optical system according to claim 2, wherein the first optical system includes:
   a front focusing lens group that moves for focusing and includes a front-side lens located adjacent to the reducing side of the intermediate lens; and
   a rear focusing lens group that moves for focusing and includes a rear-side lens disposed adjacent to the magnifying side of the intermediate lens.

8. The projection optical system according to claim 7, wherein the multiple additional lenses of the first lens group include the front focusing lens group and a front fixed lens group that does not move during focusing and includes a lens disposed on the reducing side of the front focusing lens group, and
   the second lens group includes the rear focusing lens group and a rear fixed lens group that does not move during focusing and includes a lens disposed on the magnifying side of the rear focusing lens group.

9. The projection optical system according to claim 7, wherein the intermediate lens, the front focusing lens group, and the rear focusing lens group each move toward the reducing side to shift focus from a standard state to a near side and move toward the magnifying side to shift focus from the standard state to an infinity side.

10. The projection optical system according to claim 7, wherein the front focusing lens group moves a distance Di1 to shift focus from the near side to the infinity side, the intermediate lens moves a distance Di2 to shift focus from the near side to the infinity side, the rear focusing lens group moves a distance Di3 to shift focus from the near side to the infinity side and the distance Di1, the distance Di2 and the distance Di3 satisfy a following condition $Di2 < Di1 < Di3$ 11. The projection optical system according to claim 7, wherein a combined focal length ff of the front focusing lens group, a focal length fm of the intermediate lens, and a combined focal length fr of the rear focusing lens group satisfy a following condition $fr < fm < ff$.

12. The projection optical system according to claim 1, wherein a ratio of a length Le of the first optical system to an overall length La along the optical axis from a reducing side-surface of a lens closest to the reducing side in the first optical system to the first reflective surface, and a throw ratio TR satisfy following conditions $0.62 < Le/La < 0.72$ $0.17 < TR < 0.19$.

13. The projection optical system according to claim 1, wherein a ratio of a length Lf from the first optical system to the first reflective surface to an overall length La along the optical axis from a reducing side-surface of a lens closest to the reducing side in the first optical system to the first reflective surface and a throw ratio TR satisfy following conditions $0.26 < Lf/La < 0.38$ $0.17 < TR < 0.19$.

14. A projector comprising:
a projection optical system according to claim 1, and a light modulator that forms an image on the first image plane.

\* \* \* \* \*